(12) United States Patent
Kikugawa

(10) Patent No.: US 10,089,061 B2
(45) Date of Patent: Oct. 2, 2018

(54) ELECTRONIC DEVICE AND METHOD

(71) Applicant: KABUSHIKI KAISHA TOSHIBA, Minato-ku, Tokyo (JP)

(72) Inventor: Yusaku Kikugawa, Nishitama Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/044,519

(22) Filed: Feb. 16, 2016

(65) Prior Publication Data

US 2017/0061987 A1   Mar. 2, 2017

Related U.S. Application Data

(60) Provisional application No. 62/211,628, filed on Aug. 28, 2015.

(51) Int. Cl.
| | |
|---|---|
| *G10L 21/06* | (2013.01) |
| *G06F 3/16* | (2006.01) |
| *G06F 3/0488* | (2013.01) |
| *G06F 3/0481* | (2013.01) |
| *G10L 21/10* | (2013.01) |
| *H04L 12/18* | (2006.01) |
| *H04N 7/15* | (2006.01) |
| *G06F 17/30* | (2006.01) |
| *G10L 25/54* | (2013.01) |
| *G10L 25/78* | (2013.01) |

(52) U.S. Cl.
CPC ............ *G06F 3/165* (2013.01); *G06F 3/0481* (2013.01); *G06F 3/04883* (2013.01); *G06F 17/3074* (2013.01); *G10L 21/10* (2013.01); *G10L 25/54* (2013.01); *H04L 12/1831* (2013.01); *H04N 7/15* (2013.01); *G10L 25/78* (2013.01)

(58) Field of Classification Search
CPC ...................................................... G10L 21/06
USPC ............... 704/232, 248, 246, 235; 348/14.12
See application file for complete search history.

(56) References Cited

U.S. PATENT DOCUMENTS

| 6,477,491 B1 | 11/2002 | Chandler et al. |
| 8,504,364 B2 | 8/2013 | Bodin et al. |
| (Continued) | | |

FOREIGN PATENT DOCUMENTS

| JP | 11-053385 | 2/1999 |
| JP | 2000-112490 A | 4/2000 |
| (Continued) | | |

OTHER PUBLICATIONS

U.S. Appl. No. 14/688,877, filed Apr. 16, 2015, Kikugawa.
(Continued)

*Primary Examiner* — Michael Colucci
(74) *Attorney, Agent, or Firm* — Knobbe, Martens, Olson & Bear, LLP

(57) ABSTRACT

According to one embodiment, an electronic device includes a memory and a hardware processor. The hardware processor is in communication with the memory. The hardware processor is configured to obtain a sound file including sound data and attached data, determine a type of meeting of the sound file classified based on an utterance state of the sound data, and display the sound file based on at least one of the sound data and the attached data such that the type of meeting is visually recognizable.

10 Claims, 21 Drawing Sheets

(56) References Cited

U.S. PATENT DOCUMENTS

| | | |
|---|---|---|
| 8,675,973 B2 | 3/2014 | Hirohata et al. |
| 2002/0032563 A1 | 3/2002 | Kamai |
| 2003/0050777 A1 | 3/2003 | Walker |
| 2003/0220798 A1 | 11/2003 | Schmid et al. |
| 2004/0117186 A1 | 6/2004 | Ramakrishnan et al. |
| 2004/0204939 A1* | 10/2004 | Liu .................... G10L 15/28 704/239 |
| 2005/0010639 A1* | 1/2005 | Long .................. G06Q 10/10 709/204 |
| 2005/0182627 A1* | 8/2005 | Tanaka ............ G11B 20/00007 704/248 |
| 2010/0073454 A1* | 3/2010 | Lovhaugen ........... G06F 3/0486 348/14.03 |
| 2010/0250252 A1* | 9/2010 | Yasoshima .......... H04L 12/1827 704/246 |
| 2011/0112832 A1* | 5/2011 | Prorock ................ G11B 27/36 704/235 |
| 2011/0112833 A1 | 5/2011 | Frankel et al. |
| 2011/0154192 A1* | 6/2011 | Yang .................. G06F 17/2288 715/256 |
| 2011/0301952 A1 | 12/2011 | Kishinaka et al. |
| 2012/0173229 A1 | 7/2012 | Peterson |
| 2013/0060592 A1* | 3/2013 | Motoyama ......... G06Q 10/1095 705/7.19 |
| 2013/0083903 A1 | 4/2013 | Peterson |
| 2013/0182063 A1* | 7/2013 | Jaiswal ............... H04L 65/4038 348/14.08 |
| 2013/0232150 A1* | 9/2013 | Gingras .............. G06Q 10/109 707/740 |
| 2014/0074471 A1* | 3/2014 | Sankar .................. G10L 17/02 704/246 |
| 2014/0078938 A1 | 3/2014 | LaChapelle et al. |
| 2014/0164501 A1* | 6/2014 | Herger ................... H04N 7/15 709/204 |
| 2014/0201637 A1* | 7/2014 | Na ..................... G06F 3/04847 715/719 |
| 2014/0280265 A1 | 9/2014 | Wang |
| 2014/0303969 A1 | 10/2014 | Inose et al. |
| 2014/0358536 A1 | 12/2014 | Choi |
| 2015/0025887 A1* | 1/2015 | Sidi .................... G10L 17/02 704/245 |
| 2015/0112684 A1 | 4/2015 | Scheffer et al. |
| 2015/0142434 A1 | 5/2015 | Wittich et al. |
| 2015/0205568 A1 | 7/2015 | Matsuoka |
| 2015/0206537 A1 | 7/2015 | Fusakawa et al. |
| 2015/0264310 A1* | 9/2015 | Krishnaswamy ....... H04L 65/80 348/14.12 |
| 2015/0302868 A1 | 10/2015 | Sikveland et al. |
| 2015/0310863 A1 | 10/2015 | Chen et al. |
| 2015/0364130 A1 | 12/2015 | Ponting et al. |
| 2015/0365725 A1* | 12/2015 | Belyaev ............... H04N 21/458 725/46 |
| 2016/0006574 A1* | 1/2016 | Fahlgren ................ H04L 67/02 370/261 |
| 2016/0093315 A1 | 3/2016 | Kikugawa |
| 2016/0119315 A1* | 4/2016 | Uzelac ................ H04L 63/0807 726/9 |
| 2016/0142451 A1* | 5/2016 | Ouyang ................ H04L 65/403 715/728 |
| 2016/0247520 A1 | 8/2016 | Kikugawa |

FOREIGN PATENT DOCUMENTS

| | | |
|---|---|---|
| JP | 2003-216179 A | 7/2003 |
| JP | 2005-267279 | 9/2005 |
| JP | 2007-233075 A | 9/2007 |
| JP | 2010-032792 A | 2/2010 |
| JP | 2010-054991 | 3/2010 |
| JP | 2011-102862 | 5/2011 |
| JP | 2011-191824 | 9/2011 |
| JP | 5174068 B2 | 4/2013 |
| JP | 2014-203031 A | 10/2014 |
| JP | 2015-094811 A | 5/2015 |
| JP | 2016-071029 | 5/2016 |
| KR | 2 755 399 A1 | 7/2014 |
| WO | WO 2015/198488 | 12/2015 |

OTHER PUBLICATIONS

U.S. Appl. No. 14/919,662, filed Oct. 21, 2005, Kikugawa.
U.S. Appl. No. 15/056,942, filed Feb. 29, 2016, Kikugawa.
The extended European search report issued by European Patent Office dated Feb. 22, 2016 in the corresponding European patent application No. 15161837.8—8 pages.

* cited by examiner

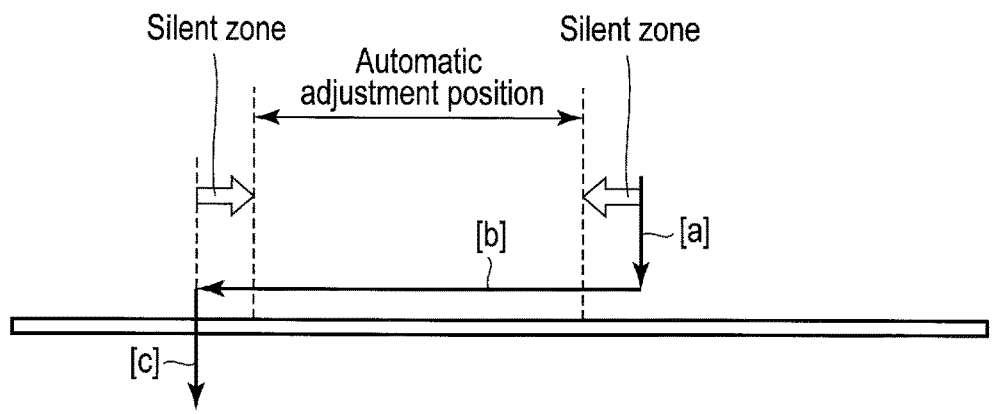
F I G. 21
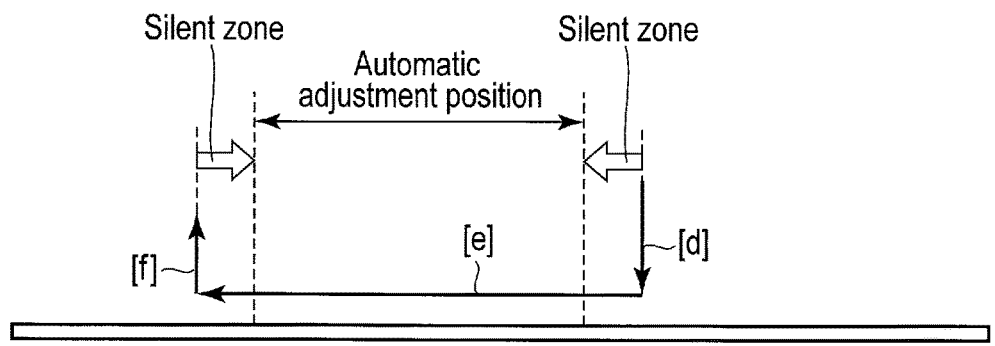
F I G. 22

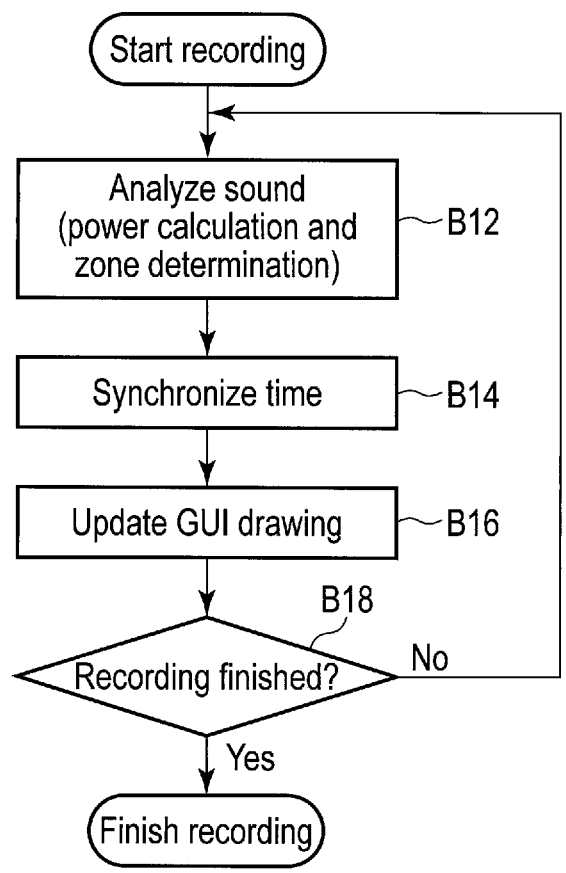
F I G. 24

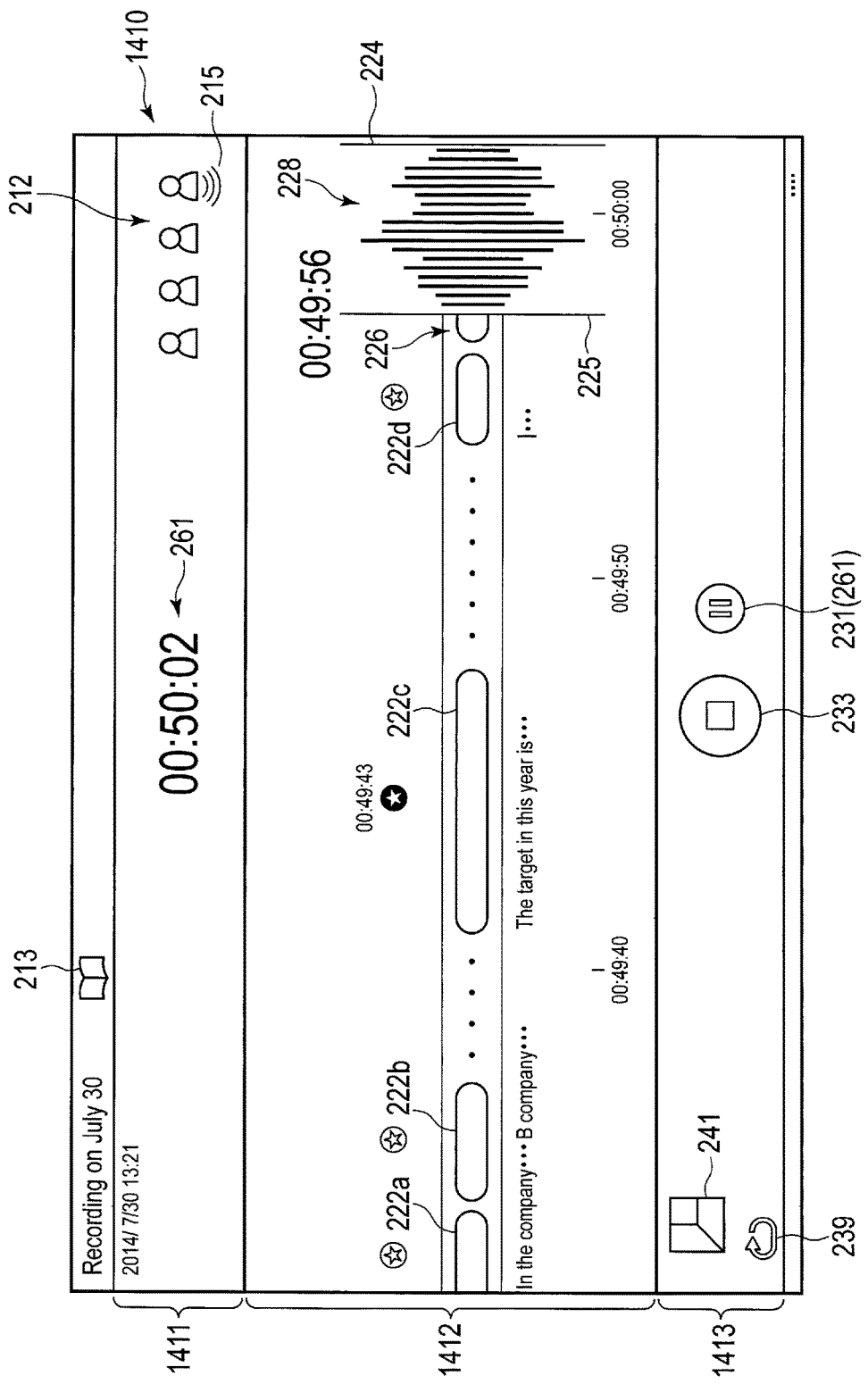
F I G. 25

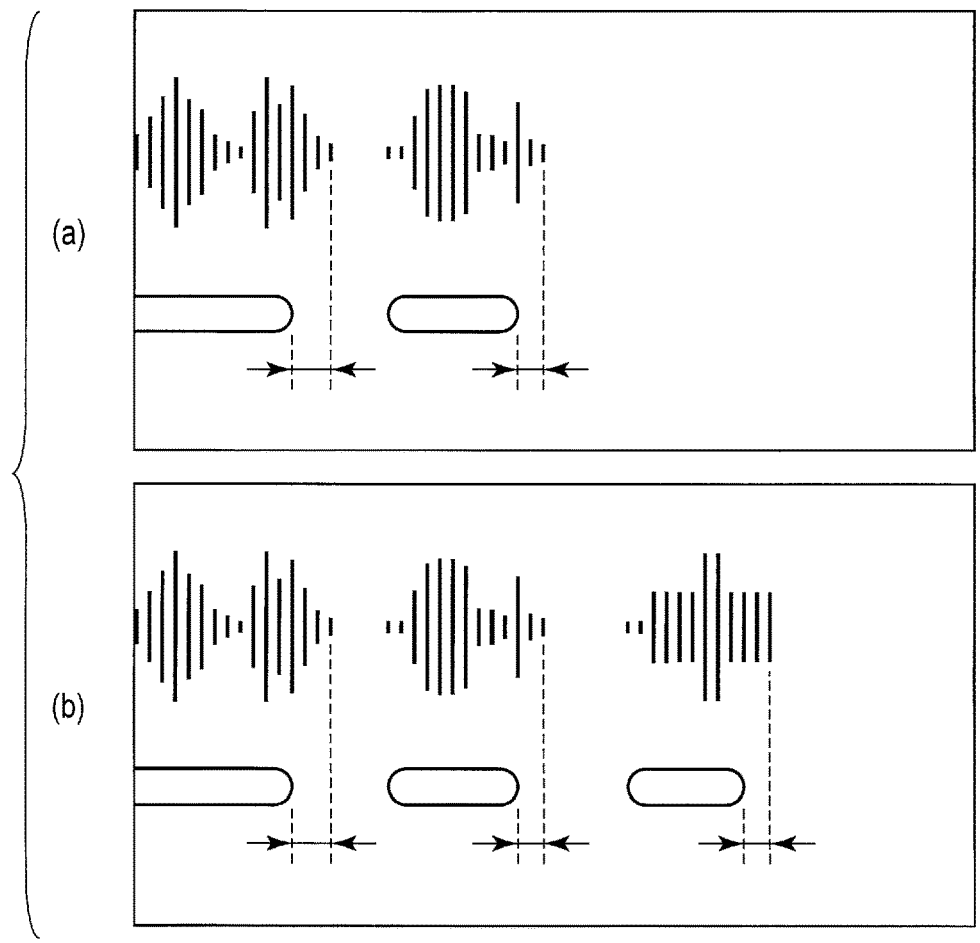
F I G. 26
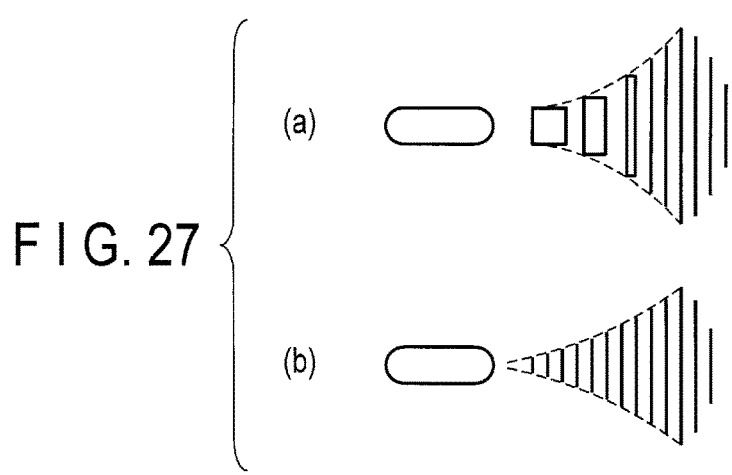
F I G. 27

ELECTRONIC DEVICE AND METHOD

CROSS-REFERENCE TO RELATED APPLICATIONS

This application claims the benefit of U.S. Provisional Application No. 62/211,628, filed Aug. 28, 2015, the entire contents of which are incorporated herein by reference.

FIELD

Embodiments described herein relate generally to an electronic device and a method.

BACKGROUND

Recently, electronic devices which can be driven by a battery and be easily carried out, such as tablets and smartphones, have been widespread. Most of these types of devices comprise a microphone and a speaker and can be used as a recorder for recording and playing back sound.

However, at the moment, there is no consideration on visualization of sound at all. Visualization of sound indicates that, for example, when a list of recorded sounds is displayed, the type of each sound is shown to help the user to find out the target sound.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 21 is an exemplary view showing an example of deletion of a certain zone of recorded sound data.

FIG. 22 is an exemplary view showing an example of cutout (trimming) of necessary information from sound data.

FIG. 24 is an exemplary flowchart showing an example of a process for displaying the recording-in-progress screen shown in FIG. 23.

FIG. 25 is an exemplary view showing another example of the recording-in-progress screen.

FIG. 26 is an exemplary view showing another example of the recording-in-progress screen.

FIG. 27 is an exemplary view showing another example of the recording-in-progress screen.

DETAILED DESCRIPTION

Various embodiments will be described hereinafter with reference to the accompanying drawings.

In general, according to one embodiment, an electronic device includes a memory and a hardware processor. The hardware processor is in communication with the memory. The hardware processor is configured to obtain a sound file including sound data and attached data, determine a type of meeting of the sound file classified based on an utterance state of the sound data, and display the sound file based on at least one of the sound data and the attached data such that the type of meeting is visually recognizable.

The electronic device of the present embodiment may be realized as, for example, a tablet or a smartphone. In this specification, the electronic device is assumed to be realized as a tablet. The elements or structures explained below can be realized by hardware. They can be also realized by software using a microcomputer (a processing unit or a central processing unit [CPU]).

Figure 1:
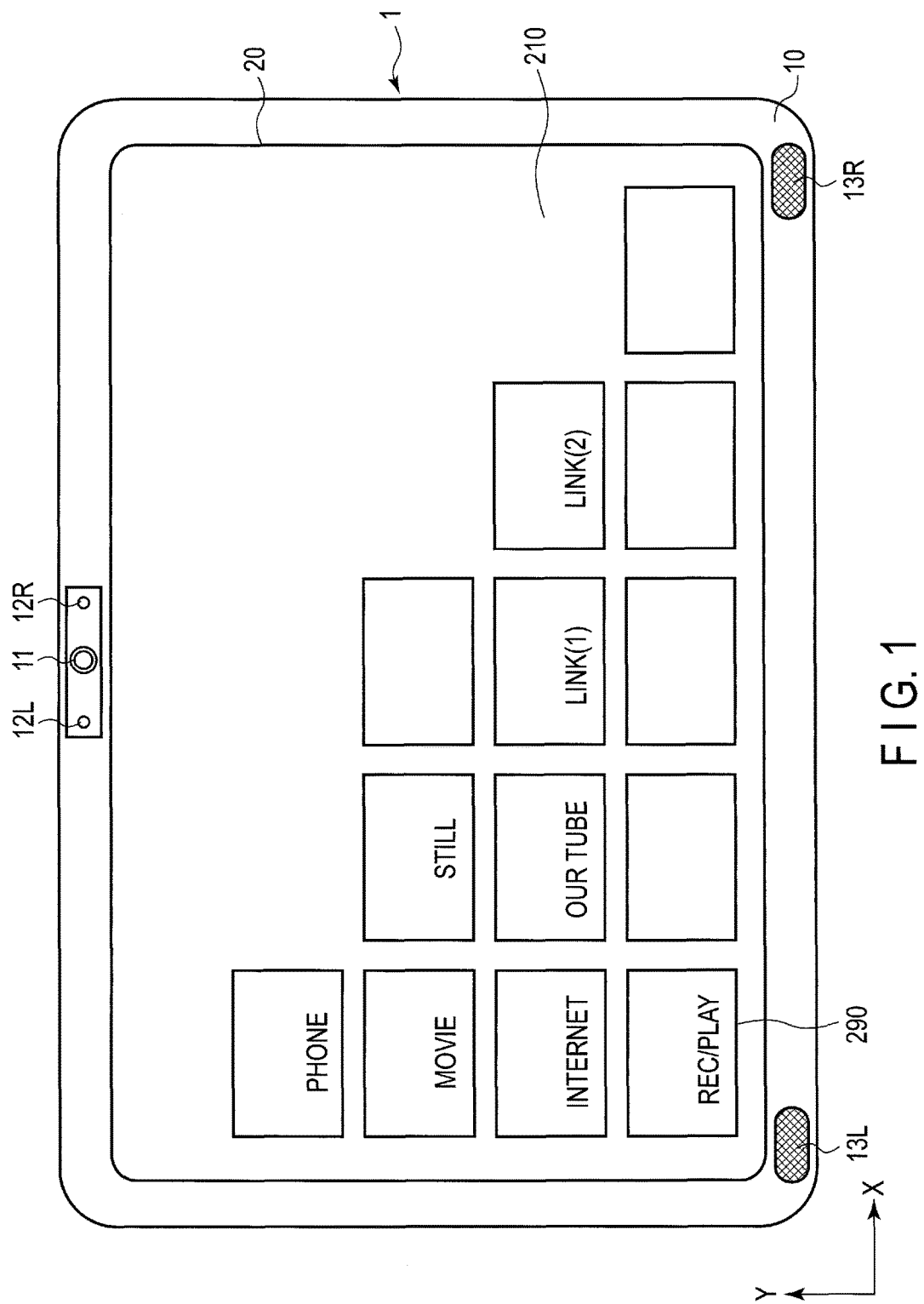
FIG. 1 is an exemplary view showing an example of the external appearance of an electronic device according to an embodiment.

FIG. 1 is an exemplary view showing an example of the external appearance of a tablet 1 which is the electronic device of the present embodiment. As shown in FIG. 1, the tablet 1 includes a main body unit (PC main body) 10 and a touchscreen display 20.

A camera 11 is located at a predetermined position on the front face of the PC main body 10, for example, in the central portion of the upper end. The camera 11 loads, as an image (image data), the data of the photographic target present in front of the touchscreen display 20, such as the user, the user and the background, or an object located around the user. First and second microphones 12R and 12L are located at other predetermined positions on the front face of the PC main body 10, for example, on both sides of the camera 11. The first and second microphones 12R and 12L load the voice or noise produced by the user or the user and an arbitrary number of people present around the user, and the surrounding sound such as the sound of wind (hereinafter, both voice and sound may be referred to as sound). The first and second microphones 12R and 12L are located such that they are substantially equally distant from the camera 11 by considering, for example, the camera 11 as the virtual center. In the present embodiment, two microphones are provided as an example. However, only one microphone may be provided. When two microphones are provided, the input direction of sound can be estimated. Based on the result of estimation, the speaker can be specified.

Speakers 13R and 13L are located at other predetermined positions of the PC main body 10, for example, at both of the lateral ends of the lower end. Speakers 13R and 13L play back sound recorded in the PC main body 10. For example, a power-on switch (power button), a lock mechanism and an authentication unit are located at other predetermined positions of the PC main body 10 although the details are omitted. The power button controls the power on/off for enabling the tablet 1 to be used (in other words, for activating the tablet 1). For example, the lock mechanism locks the operation of the power button while the tablet is carried on. For example, the authentication unit reads data (biological data) associated with a finger or a palm of the user in order to authenticate the user.

The touchscreen display 20 includes a liquid crystal display (LCD) unit (display unit) 21 and a touch panel (instruction input reception unit) 22. The touch panel 22 is provided at a predetermined position of the PC main body 10 so as to cover at least the display face (screen) of the LCD 21.

The touchscreen display 20 detects an instruction input position (a touch position or a contact position) on the display screen in contact with an external object (a stylus or a part of the body of the user such as a finger of a hand). The touchscreen display 20 has (supports) a multi-touch function capable of simultaneously detecting a plurality of instruction input positions. An external object may be a stylus or a part of the body of the user such as a finger as described above. In the explanation below, a finger of the user is employed as an example.

The touchscreen display 20 is also used as the main display which displays the screens or images (objects) of various application programs in the tablet 1. When the PC main body 10 is activated, the touchscreen display 20 receives the start (activation) of execution of an arbitrary application program to be activated by the user in accordance with an instruction input through an external object. The touchscreen display 20 displays the icons of the arbitrary number of activated application programs. The orientation of the display screen of the touchscreen display 20 can be switched between the lateral orientation (landscape) and the vertical orientation (portrait). FIG. 1 shows an example of the display of the activation completion screen in landscape orientation.

Figure 2:
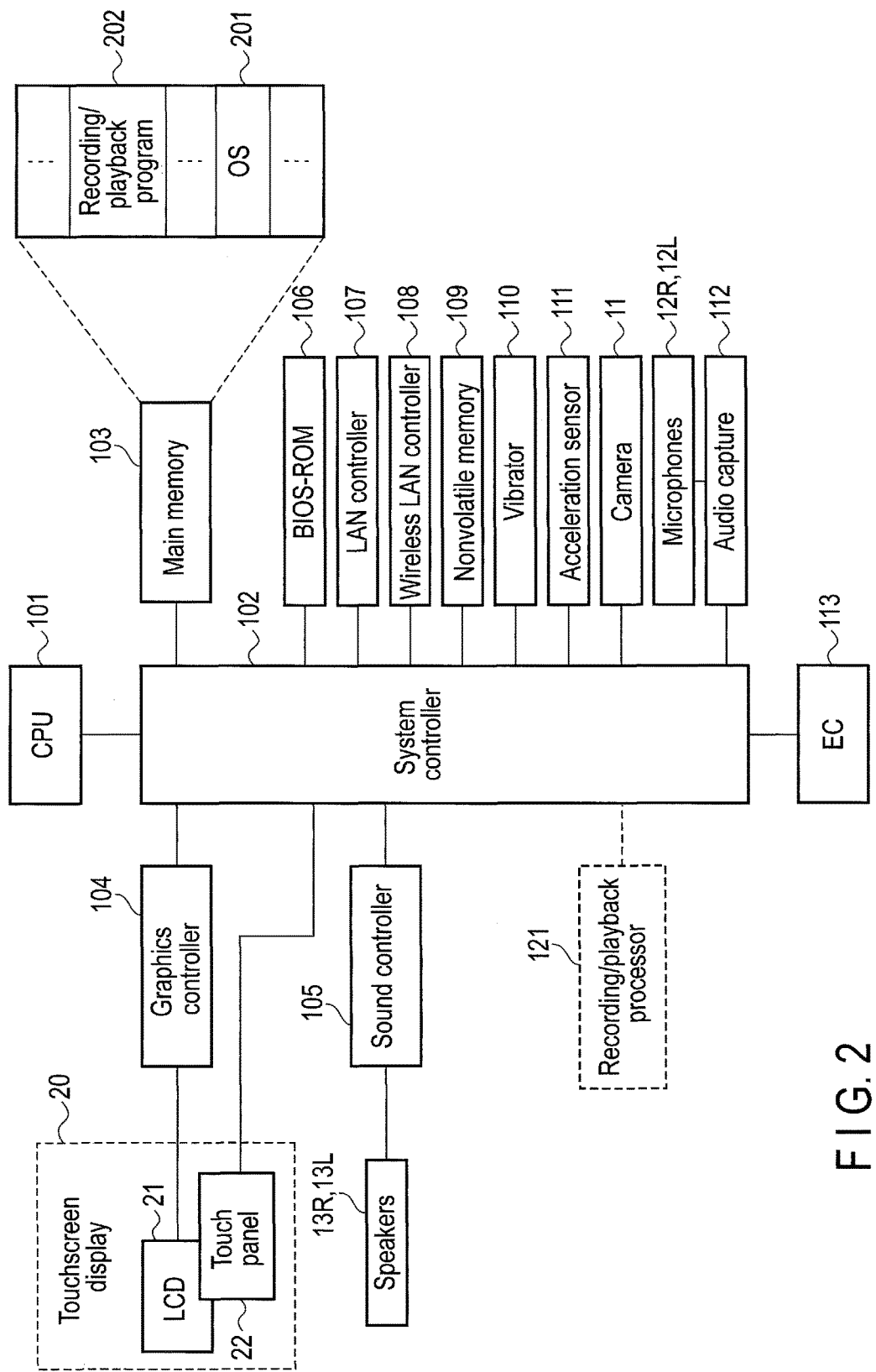
FIG. 2 is an exemplary block diagram showing an example of the system configuration of the electronic device according to the embodiment.

FIG. 2 shows an example of the system configuration of the tablet 1.

As shown in FIG. 2, the tablet 1 comprises, for example, a CPU 101, a system controller 102, a main memory 103, a graphics controller 104, a sound controller 105, a BIOS-ROM 106, a LAN controller 107, a wireless LAN controller 108, a nonvolatile memory 109, a vibrator 110, an acceleration sensor 111, an audio capture (board) 112 and an embedded controller (EC) 113.

The CPU 101 controls the operation of each module of the PC main body 10 and the touchscreen display 20. The CPU 101 executes an operating system (OS) 201 and various application programs loaded from the nonvolatile memory 109 into the main memory 103. As one of the application programs, a recording/playback program 202 is present as described later. The recording/playback program 202 is software executed under control of the OS 201. The recording/playback function may be realized by hardware in place of software, using a recording/playback processor 121 structured by, for example, a single-chip microcomputer.

The CPU 101 also executes a BIOS stored in the BIOS-ROM 106. The BIOS is a program for hardware control.

The system controller 102 is a device which connects a local bus of the CPU 101 and various components. A memory controller which controls the access to the main memory 103 is incorporated into the system controller 102. The system controller 102 has a function for communicating with the graphics controller 104 through a serial bus conforming to the PCI EXPRESS standard, etc.

The system controller 102 comprises a built-in ATA controller which controls the nonvolatile memory 109. The system controller 102 further comprises a built-in USB controller which controls various USB devices. The system controller 102 has a function for communicating with the sound controller 105 and the audio capture 112. The image data (the moving image/the still image) obtained (captured) by the camera 11 is converted into a predetermined format by the camera 11 and is supplied to an image processing program which operates in the main memory 103 through the system controller 102. Thus, the image data from the camera 11 is played back on the image processing program which is activated in accordance with a request from the user and which is allowed to play back an image having a format corresponding to the image data from the camera 11. The image data from the camera 11 is displayed on the LCD 21. The image data from the camera 11 is stored in, for example, the nonvolatile memory 109.

The graphics controller 104 is a display controller which controls the LCD 21 of the touchscreen display 20 of the PC main body 10. A display signal produced by the graphics controller 104 is transmitted to the LCD 21. The LCD 21 displays an image based on the display signal. The touch panel 22 located on the LCD 21 is a pointing device (user operation instruction input mechanism) for inputting an input signal responding to the display on the screen of the LCD 21. The user is able to input a user operation, in other words, an instruction, relative to the graphical user interface (GUI) displayed on the screen of the LCD 21, etc., through the touch panel 22. In this manner, the user is able to operate the PC main body 10. By touching an activation icon or a button displayed on the LCD 21 through the touch panel 22, the user is able to instruct execution of a function corresponding to the activation icon or the button.

The sound controller 105 is a sound source device. The sound controller 105 converts the sound data to be played back into analog output and outputs the sound data to speakers 13R and 13L.

The LAN controller 107 is, for example, a wired communication device which performs wired communication having the IEEE 802.3 standard. The wireless LAN controller 108 is, for example, a wireless communication device which performs wireless communication having the IEEE 802.11 standard.

The vibrator 110 provides the PC main body 10 with vibration depending on the need.

The acceleration sensor 111 detects the rotation of the PC main body 10 for switching the display screen of the touchscreen display 20 between the portrait orientation and the landscape orientation, the strength of impact of movement of a finger of the user, etc.

The audio capture 112 applies analog-to-digital conversion to the voice or sound obtained by each of microphone 12R (located on, for example, the right side of the camera 11) and microphone 12L (located on, for example, the left side of the camera 11) and outputs a digital signal. The audio capture 112 can input data indicating which input signal to microphone 12R or 12L has a higher level to the recording/playback program 202 operating in the main memory 103 through the system controller 102. The recording/playback program 202 can estimate the direction of the speaker based on the data. The audio capture 112 can partially or entirely perform the predetermined process usable in the recording/playback program 202.

The EC 113 is a single-chip microcomputer including an embedded controller for power management. The EC 113 controls the power on/off of the PC main body 10 in accordance with the operation of the power button by the user.

Figure 3:
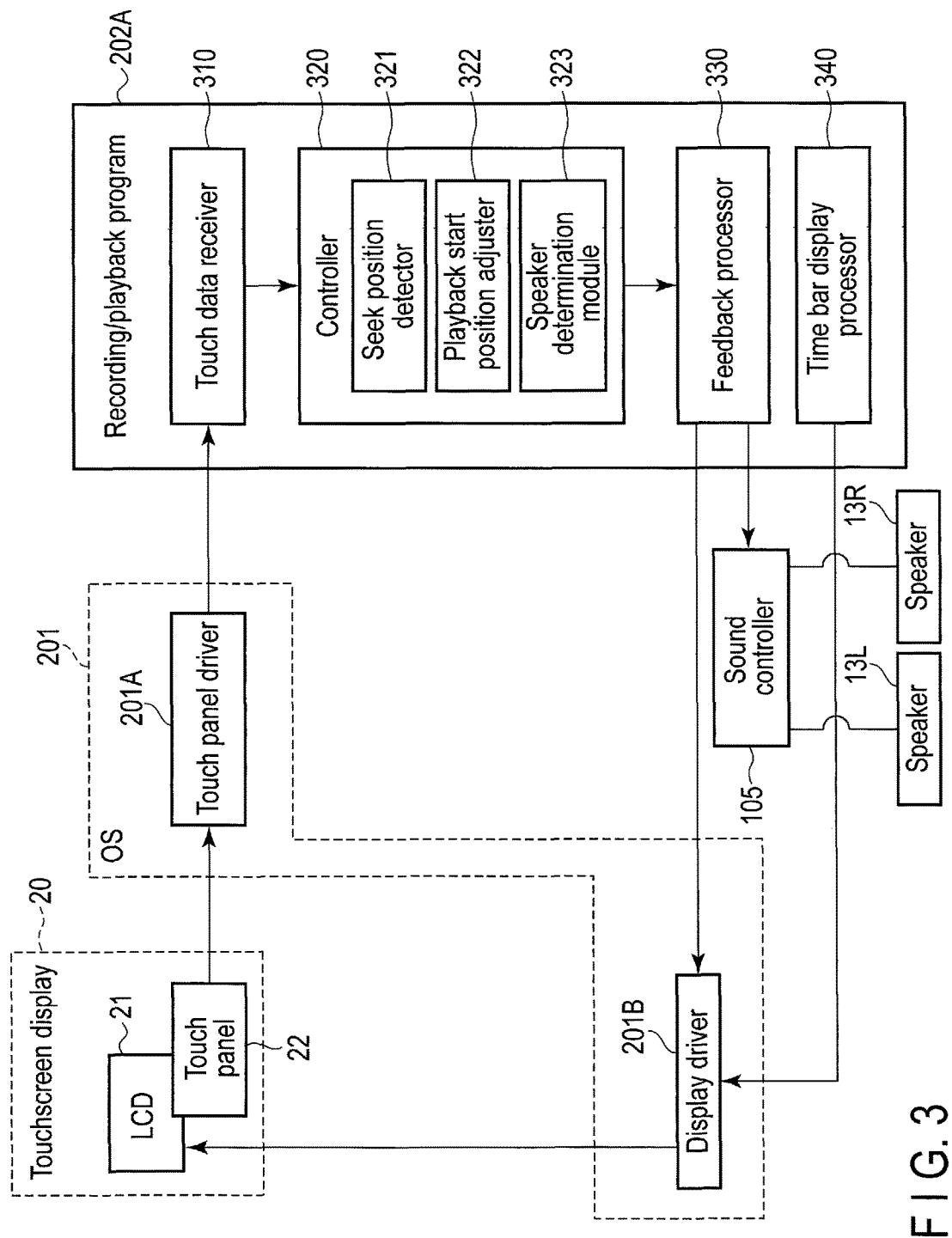
FIG. 3 is an exemplary view showing an example of the configuration of a portion related to playback and editing of a recording/playback program operating in the electronic device according to the embodiment.

Now, an example of the configuration of the recording/playback program 202 is explained. The recording/playback program 202 has a function for recording sound, a function for playing back stored sound and a function for editing stored sound. For the sake of convenience, this specification separately explains a portion related to recording and a portion related to playback and editing. With reference to FIG. 3, this specification firstly explains portion 202A related to the playback and editing of the recording/playback program 202. The recording/playback program 202A comprises at least a touch data receiver 310, a controller 320, a feedback processor 330 and a time bar display processor 340 as function modules for performing a playback/editing function.

The touch data receiver 310 receives first coordinate data, second coordinate data and data of user's finger movement from the touch panel 22 via a touch panel driver 201A for each user's instruction (each operation of a finger of the user). The touch data receiver 310 outputs the data to the controller 320. The first coordinate data is the coordinate data (x, y) of the contact position which is an arbitrary position on the display surface of the touch panel 22 with a finger of the user. The second coordinate data is the coordinate data (x', y') of the position on the display surface of the touch panel 22 from which the finger of the user is separated. The data of user's finger movement includes data of user's finger movement between the first coordinate data (x, y) and the second coordinate data (x', y'), or data of user's finger movement attached to the second coordinate data, for example, data of the direction of the finger when it is separated.

In the present embodiment, user's input operations (in other words, user's finger movements) are defined as follows.

[1] Touch: A finger of the user is located at a predetermined position on the display surface of the touch panel 22 for a certain period. (The first coordinate data is substantially the same as the second coordinate data. The finger is separated in a direction substantially perpendicular to the display surface after the elapse of a certain period.)

[2] Tap: A finger of the user is in contact with an arbitrary position on the display surface of the touch panel 22 for a predetermined period. Subsequently, the finger is separated in a direction perpendicular to the display surface. (Tap may be used synonymously with touch.)

[3] Swipe: After a finger of the user comes in contact with an arbitrary position on the display surface of the touch panel 22, the finger moves in an arbitrary direction. (Data of finger movement is included between the first coordinate data and the second coordinate data; in other words, the finger of the user moves on the display surface so as to trace the display surface).

[4] Flick: After a finger of the user comes in contact with an arbitrary position on the display surface of the touch panel 22, the finger moves in an arbitrary direction as if the finger is swept, and the finger is separated from the display surface. (When the finger of the user is separated from the display surface in tap, the data of direction is attached.)

[5] Pinch: After two fingers of the user come in contact with an arbitrary position on the touch panel 22, the interval between the fingers is changed on the display surface. In particular, when the interval between the fingers is expanded (in other words, when the fingers are separated), the operation may be called pinch-out. When the interval between the fingers is narrowed (in other words, when the fingers are brought together), the operation may be called pinch-in.

The controller 320 executes a program (application) corresponding to the user's operation (the instruction input from the user) specified by the data of the above user's finger movements [1] to [5] based on the first coordinate data, the second coordinate data and the data of user's finger movement output by the touch data receiver 310. The controller 320 executes a program corresponding to the instruction input from the user based on the first coordinate data, the second coordinate data and the data of user's finger movement from the touch data receiver 310 in both a keyboard mode and a mouse mode which are the operation modes explained below. Touch [1] may be an operation based on tap [2]. In the present embodiment, the controller 320 substantially determines that the operation is swipe [3] when the user moves his/her finger on the display surface of the touch panel 22 subsequent to touch. When the controller 320 receives the coordinate data (x', y') of the position from which the user's finger is separated after the move of the touch panel 22, the controller 320 determines this operation as swipe [3] or flick [4]. The controller 320 can calculate the swipe length (in other words, the length of instruction zone) traced (swiped) by the user's finger on the display surface of the touch panel 22 based on the first coordinate data, the second coordinate data and the data of user's finger movement from the touch panel 22. In other words, the length of instruction zone (in other words, the swipe length) can be calculated as the length of zone based on a seek position in the editing of sound data as explained later.

In the keyboard mode, in general, the touchscreen display 20 is allowed to be used as a virtual keyboard by outputting a character code unique to a corresponding individual key in accordance with the tap from the touch panel 22 relative to the image of keyboard array displayed on the LCD 21. The mouse mode is an operation mode which outputs relative coordinate data indicating the direction and the distance of movement of the contact position on the touch panel 22 (with a finger) in accordance with the movement of the contact position.

When the user touches a recording/playback icon 290 (see FIG. 1) out of predetermined icons (or buttons) displayed on the display surface of the touch panel 22, the controller 320 activates an application associated with the recording/playback icon 290 corresponding to the coordinate data of the position of the user's finger on the display surface; in other words, the controlling module activates the recording/playback program 202.

The controller 320 includes, for example, a seek position (user specification position) detector 321, a playback start position adjuster 322 and a speaker determination module 323 as function modules for playing back and editing of the recording/playback program 202.

The seek position detector 321 specifies the seek position based on the first coordinate data, the second coordinate data and the data of user's finger movement from the touch data receiver 310.

That is to say, the seek position detector 321 specifies the seek position corresponding to the user's instruction on the time bar display where the axis of time conforms with the X-axis on the X-Y plane displayed on the LCD 21.

The playback start position adjuster 322 buffers the sound data near the seek position specified by the seek position detector 321, detects a silent zone which is the head of a voice zone near the seek position, and sets the automatic adjustment position used as the playback start position.

The speaker determination module 323 specifies the speaker regarding the neighboring sound data sectionalized by using the silent zone detected by the playback start position adjuster 322 based on the sound data. Various types of methods have been already known as the method for determining (specifying) the speaker. Therefore, the explanation of details of the method for determining the speaker is omitted here.

The feedback processor 330 is connected to a display driver 201B (the graphics controller 104 in FIG. 2) which is incorporated into the OS 201 (and is the firmware of the OS 201), and the sound controller 105.

The feedback processor 330 processes a display signal for displaying various types of information on a screen 210 of the PC main body 10, and a sound output signal played back by the recording/playback program 202. This process is explained later with reference to the examples of screen displays shown in FIG. 5, etc.

The feedback processor 330 can perform, relative to the sound controller 105, control for changing the output ratio of playback sound output by speaker 12R to that by speaker 12L based on, for example, the position of the speaker corresponding to sound data during playback such that the position of the speaker during recording can be played back in a pseudo manner.

The time bar display processor 340 is a function module for causing the display driver 201B (the graphics controller 104 in FIG. 2) which is incorporated into the OS 201 (and is the firmware of the OS 201) to display a time bar 211 on image display corresponding to the display surface of the touch panel 22 on an on-screen display (OSD) basis.

Figure 4:
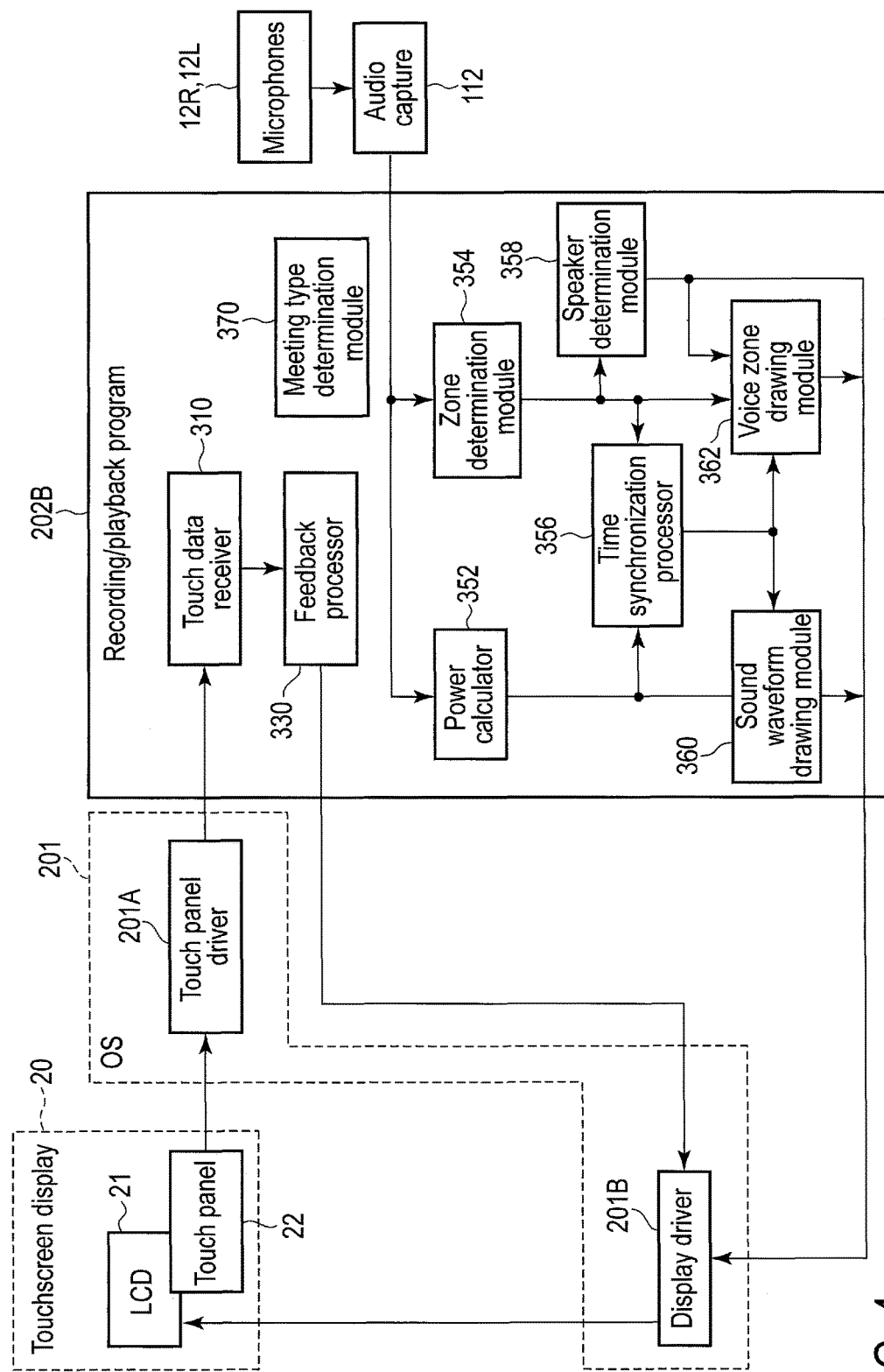
FIG. 4 is an exemplary view showing an example of the configuration of a portion related to recording of the recording/playback program operating in the electronic device according to the embodiment.

FIG. 4 shows an example of the configuration of portion 202B related to the recording of the recording/playback program 202.

The recording/playback program 202 comprises at least the touch data receiver 310, the feedback processor 330, a power calculator 352, a zone determination module 354, a time synchronization processor 356, a speaker determination module 358, a sound waveform drawing module 360, a voice zone drawing module 362 and a meeting type determination module 370 as function modules which realize a function for recording sound.

The touch data receiver 310 and the feedback processor 330 are the same as those of program portion 202A of the playback/editing function.

The sound data from microphones 12R and 12L is input to the power calculator 352 and the zone determination module 354 via the audio capture 112. The power calculator 352 calculates, for example, a root-mean-square with respect to sound data at certain time intervals and uses the result as power. The power calculator 352 may use the maximum value of the amplitude of sound data at certain time intervals as power in place of a root-mean-square. Since a certain time interval is several milliseconds, power is calculated substantially in real time. The zone determination module 354 applies voice activity detection (VAD) to sound data and sectionalizes the sound data into a voice zone in which a person produces voice and the other zone which is a non-voice zone (a noise zone and a silent zone). As another example of voice activity detection, in addition to the separation into a voice zone and a non-voice zone, the speaker of a voice zone may be specified. Thus, a voice zone may be obtained for each speaker. If two or more microphones are provided, the speaker can be specified by estimating the direction of sound from the difference between the input signals of two microphones and using the result of estimation. Even when only one microphone is provided, speaker data can be obtained in addition to determination of a voice zone and a non-voice zone by calculating a feature amount such as the mel-frequency cepstral coefficient (MFCC) and analyzing the feature amount in a clustering manner. It is possible to show a larger amount of information to the user by specifying the speaker. In the zone determination module 354, approximately several seconds are required for calculation. Therefore, the result of voice activity detection cannot be obtained in real time and is obtained approximately one second late.

The outputs of the power calculator 352 and the zone determination module 354 are supplied to the sound waveform drawing module 360 and the voice zone drawing module 362, respectively, and are also supplied to the time synchronization processor 356. As stated above, the power calculation is performed substantially in real time and is output at certain time intervals. However, approximately one second is required for the calculation for voice activity detection. The determination of a voice zone or a non-voice zone is performed for each sound data item longer than a certain period. Thus, the two processes are different from each other in the processing time. Therefore, delay may be caused in the outputs between the power calculator 352 and the zone determination module 354. The output of the power calculator 352 is displayed by a waveform indicating the power level. The output of the zone determination module 354 is displayed by a bar indicating zones. When the waveform and the bar are displayed in the same row, the start time of drawing differs between them. The waveform is displayed first, and the bar is displayed from a certain time point. The time synchronization processor 356 does not switch this display for a moment, and gradually switches the display from the waveform to the bar. Specifically, a waveform/bar transition portion 226 is provided in the area for switch between the waveform display and the bar display. This portion is explained later with reference to FIG. 23, etc.

The sound waveform drawing module 360 and the voice zone drawing module 362 correspond to the time bar display processor 340 shown in FIG. 3. Their outputs are supplied to the display driver 201B. The output of the speaker determination module 358 is also supplied to the display driver 201B.

The meeting type determination module 370 determines the type of meeting of recorded sound based on the result of determination of a voice zone or a non-voice zone by the zone determination module 354, the result of specification of the speaker by the speaker determination module 358, etc. The type of meeting is classification based on the utterance state. The determination of the type of meeting is explained later with reference to FIG. 11, etc. In this example, the meeting type determination module 370 is provided in portion 202B related to the recording of the recording/playback program 202. However, the meeting type determination module 370 may determine the type of meeting at various time points after recording in addition to at the time of recording.

Figure 5:
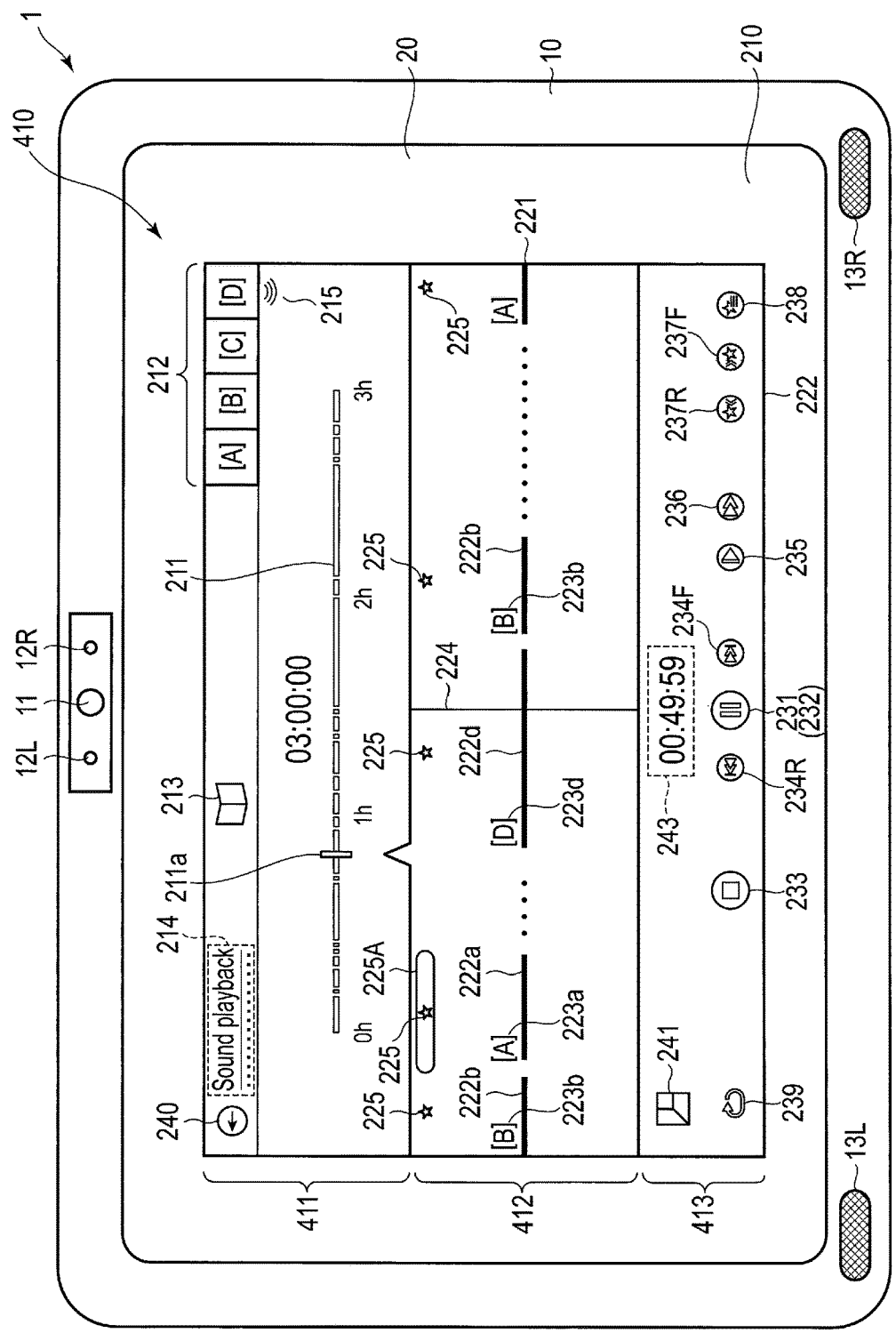
FIG. 5 is an exemplary view showing an example of a sound data display screen displayed at the time of playing back sound data recorded by the recording/playback program operating in the electronic device according to the embodiment.

FIG. 5 shows an example of a sound data display screen in a state where the recording/playback program 202 is activated. The display example shown in FIG. 5 is an example which is displayed at the time of playing back sound data recorded by the recording/playback program 202.

A sound data display screen 410 which is displayed within the screen 210 of the PC main body 10 when the recording/playback program 202 is operated includes three display areas into which the screen is roughly and vertically sectionalized. The three display areas are a first display area 411, a second display area 412 and a third display area 413.

The first display area 411 displays the time bar 211 indicating the whole part of sound content (sound data) which is played back in progress (or the whole part of sound content to be played back), and a locator (a sound playback position display) 211a indicating the current playback position of sound content or the start position of sound playback instructed by the user. The locator 211a is located at a time point in which the playback time (elapsed time) from the head of the content is proportionally distributed relative to the total time indicated by the time bar 211.

The first display area 411 includes, for example, a speaker display area 212 for displaying each of the specified speakers, a list display button 213 for displaying a list, a record field 214 for displaying the record name and a return button 240.

The speaker display area 212 can display up to ten specified speakers by the alphabet, for example, [A] to [J], when the content is played back. (In the example of FIG. 5, four speakers [A] to [D] are displayed.) The speaker display area 212 can display the speaker who is currently speaking by an utterance mark 215.

The second display area 412 includes, for example, a playback position display field 221 for displaying the playback position (time) of sound content (sound data), utterance bars 222a, 222b, . . . , 222n (n is a positive integer) indicating voice zones, speaker identifiers 223a, 223b, . . . , 223n (n is a positive integer), a current position mark (line) 224 and a marking button (star mark) 225.

When sound content is played back, the playback position display field 221 displays the time (sound data) which was played back on the left side of the current position mark (line), and the time (sound data) which will be played back on the right side of the current position mark (line).

Utterance bars 222a, 222b, . . . , 222n display the length (time) of sound data of each speaker in association with the speaker on the playback position display field 221. Thus, speaker identifiers 223a, 223b, . . . , 223n (n is a positive integer) are integrally attached to utterance bars 222a, 222b, . . . , 222n. The current position mark (line) 224 indicates the current position (time) on the playback position display field 221. The sound data of each speaker for playback can be selected by applying a swipe operation to utterance bars 222a, 222b, . . . , 222n. The number of speaker zones (utterance bars) to be skipped can be changed by changing the strength (speed/pressure) of swipe (finger movement) (in other words, by changing the speed or pressure when the user moves his/her finger on the display surface).

The marking button 225 is displayed near substantially the central portion of the utterance bar 223 (223a to 223n) of each speaker in the length (time) direction. Each utterance can be marked by tapping the vicinity of the marking button 225. For example, when the marking button 225 is selected, the color of a slender area 225A corresponding to the voice zone around the selected button 225 is changed. The color change indicates that the button is marked. When the vicinity of the marked button 225 is tapped again, the marking is canceled, and the slender area 225A is deleted. Thus, only the star mark is displayed. Marking data can be used for the immediate access to a specific position when sound data is played back. Thus, convenience is improved in playback.

The third display area 413 includes, for example, a pause button 231/a play button 232, a stop button 233, a skip (forward) button 234F, a skip (return) button 234R, a slow-motion play button 235, a high-speed play button 236, a mark skip (forward) button 237F, a mark skip (return) button 237R, a mark list display button 238 and a repeat button 239. The third display area 413 includes a display switch button 241 which allows the user to input an instruction for switching the display style of the screen 210 with the snap view screen described later.

The pause button 231 and the play button 232 are toggle buttons which are displayed alternately. By touching or tapping the play button 232, the playback of the selected sound data (content) is started. In a state where content is played back by the play button 232, the pause button 231 is displayed. When the pause button 231 is touched or tapped, the playback of content is temporarily stopped, and the play button 232 is displayed.

The stop button 233 is used to stop the playback of content during playback or pause.

By touching or tapping the skip (forward) button 234F or the skip (return) button 234R, one utterance bar 222 (222a, 222b, . . . , 222n) is skipped. When the skip (forward) button 234F is touched or tapped, one utterance bar 222 (222a, 222b, . . . , 222n) is skipped in the playback position display field 221 in the right direction on the screen 210; in other words, one sound data item (utterance bar) which will be played back is skipped. When the skip (return) button 234R is touched or tapped, one utterance bar 222 (222a, 222b, . . . , 222n) is skipped in the playback position display field 221 in the left direction on the screen 210; in other words, one sound data item (utterance bar) which was played back is skipped. When the skip button display is tapped, it is possible to input a control command for enabling the skip of each utterance. Skip can be performed only for each utterance. (When skip is performed, the current position is jumped to the head of the next voice zone (utterance bar).

The slow-motion play button 235 applies slow-motion playback of, for example, 0.5 times or 0.75 times slower than normal, to the sound data which is currently played back. When the slow-motion play button is tapped, for example, playback of 0.75 (3/4) times slower than normal, playback of 0.5 (1/2) times slower than normal, and normal playback are repeated in order.

The high-speed play button 236 applies high-speed playback of, for example, 1.25 times, 1.5 times, 1.75 times or twice as fast as normal, to the sound data which is currently played back. When the high-speed play button is tapped, for example, playback of 1.25 (5/4) times as fast as normal, playback of 1.5 (3/2) times as fast as normal, playback of twice as fast as normal and normal playback are repeated in order. In either case of slow-motion playback or high-speed playback, the status (for example, playback of X-times slower/faster) is preferably displayed in a predetermined display area.

The mark skip (forward) button 237F and the mark skip (return) button 237R allow the current position to skip to the utterance bar provided with the marked button 225. When the mark skip (forward) button 237F is touched or tapped, the current position skips to, out of utterance bars provided with the marked buttons 225, the sound data (utterance bar) which will be played back in the playback position display field 221 in the right direction on the screen 210. When the mark skip (return) button 237R is touched or tapped, the current position skips to, out of utterance bars provided with the marked buttons 225, the sound data (utterance bar) which was played back in the playback position display field 221 in the left direction on the screen 210. In this manner, it is possible to access to the marked utterance in a short time.

The mark list display button 238 is used to display, as a list of files, all of the utterance bars provided with the marking buttons 225 (regardless of whether or not the bars are marked) in a pop-up manner. This display is explained later with reference to FIG. 16.

The repeat button 239 applies repeat playback to sound data corresponding to the utterance bar which is currently played back.

The return button 240 is used to input a control signal for returning to the operation state immediately before the current state to the system controller 102.

The display switch button 241 is used to input display switch for switching the display style of the screen 210 with the snap view screen.

On the screen 210 shown in FIG. 5, the user brings his/her finger into contact with the locator 211a, swipes the finger in the direction of the axis of time of the time bar 211 and separates the finger at an arbitrary position. In this manner, the user sets the automatic adjustment position explained below under the control of the playback start position adjuster 322 explained with reference to FIG. 3.

Various displays which are shown in FIG. 5 and described above are applied on the LCD 21 under the control of the feedback processor 330 explained with reference to FIG. 3. With regard to various display signals output by the feedback processor 330, an image signal (display signal) may be output for displaying speaker identifiers 223a, 223b, . . . , 223n in the display field 221 such that the speaker who is currently played back can be specified. A display signal may be output by the feedback processor 330 such that the background color of the display of speaker identifiers 223a, 223b, . . . , 223n corresponding to the speaker who is currently played back in the display field 221 of the playback position of sound data is changed. This allows the user to visually identify each speaker. The feedback processor 330 may output an image signal (display signal) which enables an arbitrary display; for example, the brightness of the display of the identifier of the speaker may be changed, or the display may be blinked. Further, the feedback processor 330 may display the utterance mark 215 near the identifier of the speaker.

The feedback processor 330 may output an image signal (display signal) such that, for example, the display color of the identifier of each speaker in the display field 221 of the playback position (time) of sound data (in other words, the second display area 412) is the same as that in the speaker display area 212.

In FIG. 5, the time bar 211 displays the content which is played back in progress from the head position (0 hours and 0 minute) to the end position (XX hours and XX minutes; for example, 3 hours and 0 minute) with a predetermined length in the display area of the LCD 21 of the touchscreen display 20. The locator 211a displays the elapsed time (elapsed state) from the head position to the current playback position of the content during playback at a position from the head position of the content where the entire length of the time bar 211 is proportionally distributed on the time bar 211. Thus, the amount of movement of the locator 211a depends on the entire length of the time bar 211, in other words, the total time of the content during playback. When the user seeks the playback position of the content which is currently played back by moving the locator 211a on the time bar 211 for playback, the recording/playback program 202 is capable of automatically adjusting the start position of sound playback to a predetermined position near the position specified by the user.

On the screen 210 shown in FIG. 5, only touch and drag operations can be performed for the information or the status displayed in the first display area 411. On the other hand, a swipe operation can be performed to input an instruction for the information or the status displayed in the second display area 412. That is, the recording/playback program 202 can operate sound data through a swipe operation. At this time, the number of speaker zones to be skipped can be changed based on the strength of swipe.

Now, this specification explains the automatic adjustment of the playback start position when sound data is played back by the recording/playback program 202. An example of the operation of the controller 320 is explained, assuming that the recording/playback program 202 is executed by the recording/playback icon 290 shown in FIG. 1, and an activation instruction is input to the recording/playback program 202.

Figure 6:
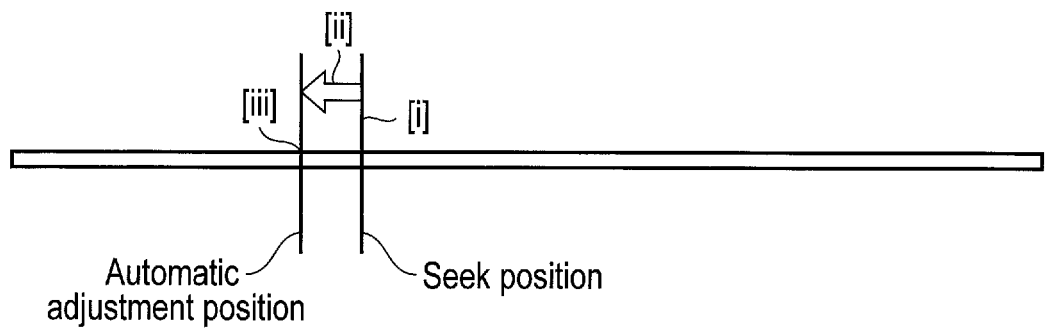
FIG. 6 is an exemplary view showing the concept of automatic adjustment of the playback start position by the recording/playback program operating in the electronic device according to the embodiment.

FIG. 6 shows the concept of automatic adjustment for automatically adjusting the playback start position in sound playback.

The user moves (swipes) the locator 211a on the time bar 211 shown in FIG. 5 and separates the finger from the touch panel 22 at an arbitrary position. In this manner, the user specifies the seek position ([i] in FIG. 6). It is obvious that the seek position is specified by the seek position detector 321 of the controller 320 shown in FIG. 3.

Subsequently, the sound data near the seek position ([ii] in FIG. 6) is buffered to detect a silent zone which is the head of a voice zone near the seek position. Thus, the automatic adjustment position ([iii] in FIG. 6) used as the playback start position is set. In short, the playback start position in the recording/playback program 202 is automatically adjusted. As stated above, the playback start position is automatically adjusted by the playback start position adjuster 322 of the controller 320.

Figure 7:
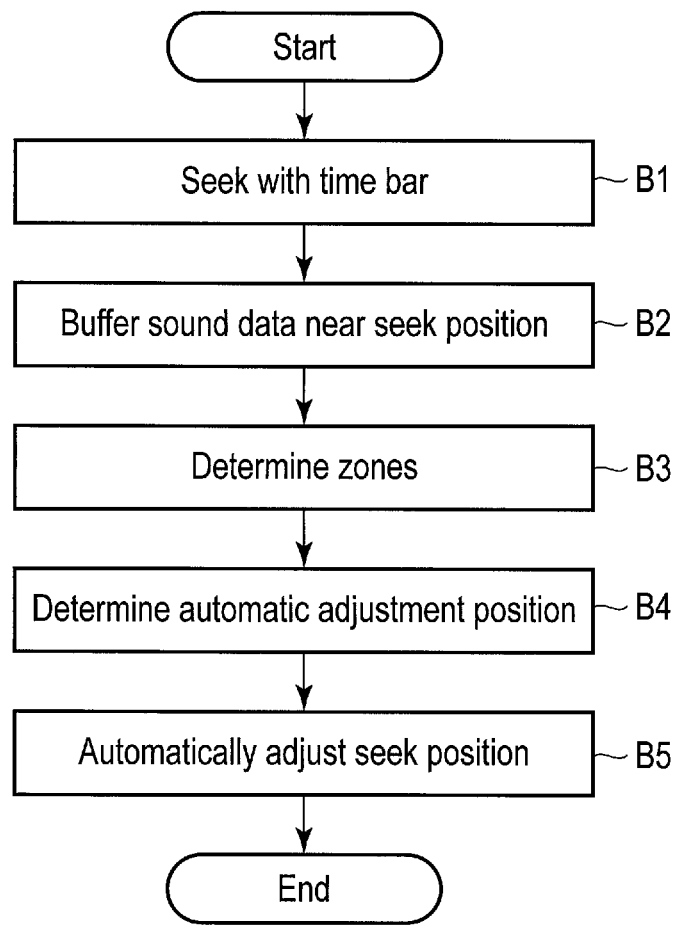
FIG. 7 is an exemplary flowchart showing the flow of the process of automatic adjustment of the playback start position by the recording/playback program operating in the electronic device according to the embodiment.

Now, this specification explains the flow of the process for automatically adjusting the playback start position shown in FIG. 6, referring to FIG. 7. The time bar 211 and the locator 211*a* correspond to the display examples shown in FIG. 5.

In block B1, the position to which the user moved the locator 211*a* on the time bar 211 is temporarily stored as the seek position (as the position specified by the user).

In block B2, the sound data near the sound data of the seek position is buffered.

In block B3, with regard to the buffered sound data, the range in which the amplitude is less than the absolute value of a threshold γ is determined as a silent zone (silent period).

In block B4, with regard to the sound data determined as a silent zone, from which silent zone playback should be started is determined (specified). Further, from which position in the silent zone playback should be started is determined (specified).

In block B5, automatic adjustment is performed, considering the specified silent zone (position) as the playback start position.

Figure 8:
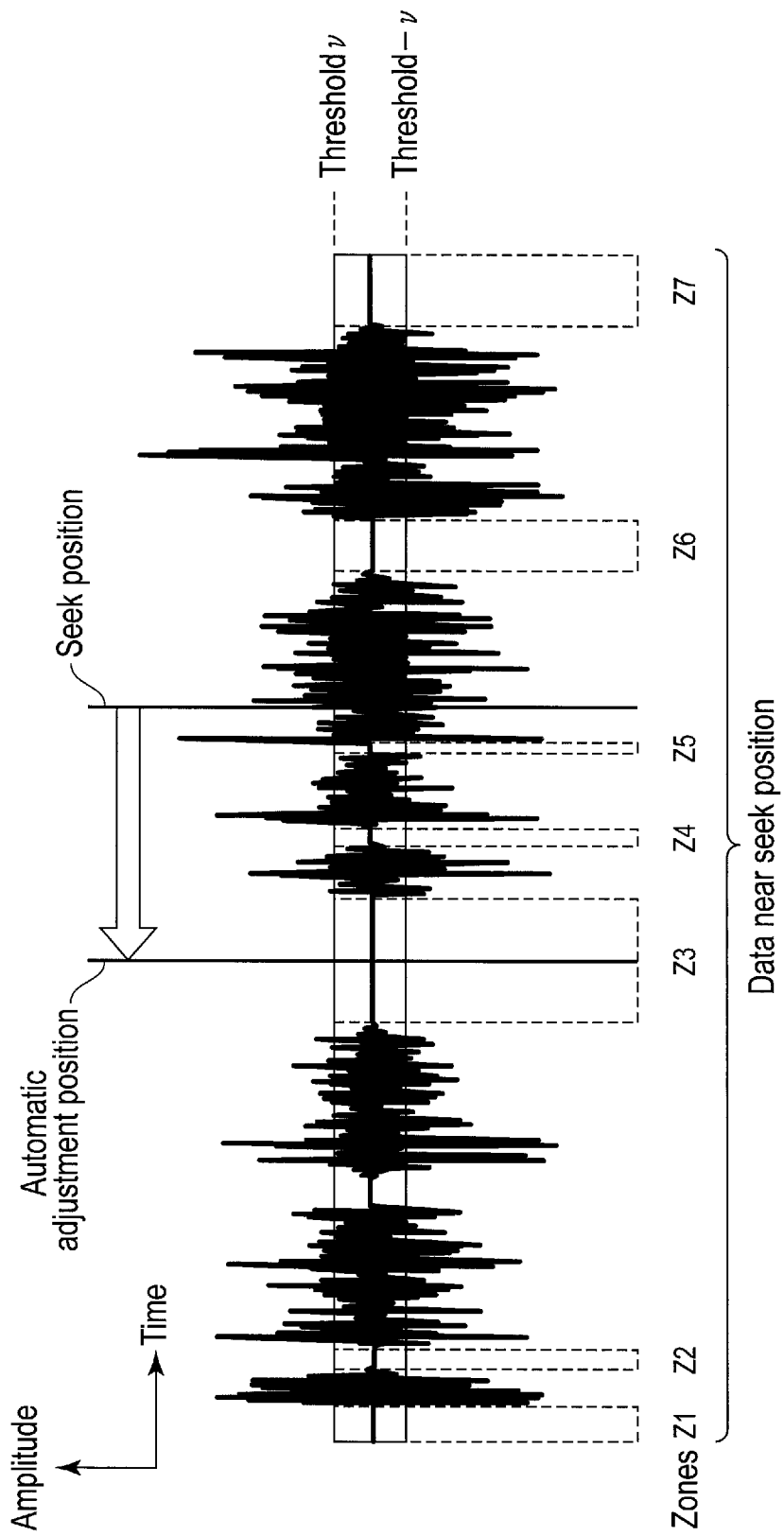
FIG. 8 is an exemplary waveform chart specifically showing the automatic adjustment of the playback start position shown in FIG. 7.

FIG. 8 is an exemplary waveform chart specifically showing the automatic adjustment of the playback start position shown in FIG. 7.

From the seek position specified by the user operation, the head of sound data (a group of sounds) before (in other words, earlier than) at least the seek position on the axis of time is detected. A group of sounds refers to a section by silent zones described later out of the utterance (voice production) of an arbitrary speaker. A group of sounds may be based on, for example, the switch of scenes in a conversation or a meeting among a plurality of users, a musical performance or a television program (content).

To detect the head of sound data, firstly, a predetermined period of sound data which includes a temporal change before and after the seek position such that the seek position is substantially the center is buffered.

Subsequently, with regard to the buffered sound data, the range in which the amplitude is less than the absolute value of a threshold γ, in other words, less than the range between a threshold γ and a threshold −γ, is determined as a silent zone (silent period) Z.

With regard to the sound data determined as silent, silent zones Zs (s=1, 2, 3, . . . , n; n is a positive integer) are estimated by counting the successive number. (In other words, one or more sections are specified.) Lastly, the playback start position is automatically adjusted to the position of one of silent zones Zs.

With regard to which silent zone Zs should be selected (in other words, what number of zone should be played back), the zone closest to the seek position may be selected, or the longest zone may be selected. Apart from the above, the optimal value of switch in conversation (in other words, the length of a silent zone) may be evaluated in advance. The section having a silent zone having a length closest to the evaluated length may be determined as the playback start position. The length of a silent zone is, for example, 1 to 2 seconds, 2 to 3 seconds or 3 to 4 seconds. The specific position for seek in the silent zone (in other words, the specific position for the playback start position in the silent zone) may be any position such as the middle, the end or the head of the silent zone.

Now, this specification explains the playback of stored sound, the recording of sound and the setting before recording by the recording/playback program 202 with reference to display examples of the screen 210 of the PC main body 10.

Figure 9:
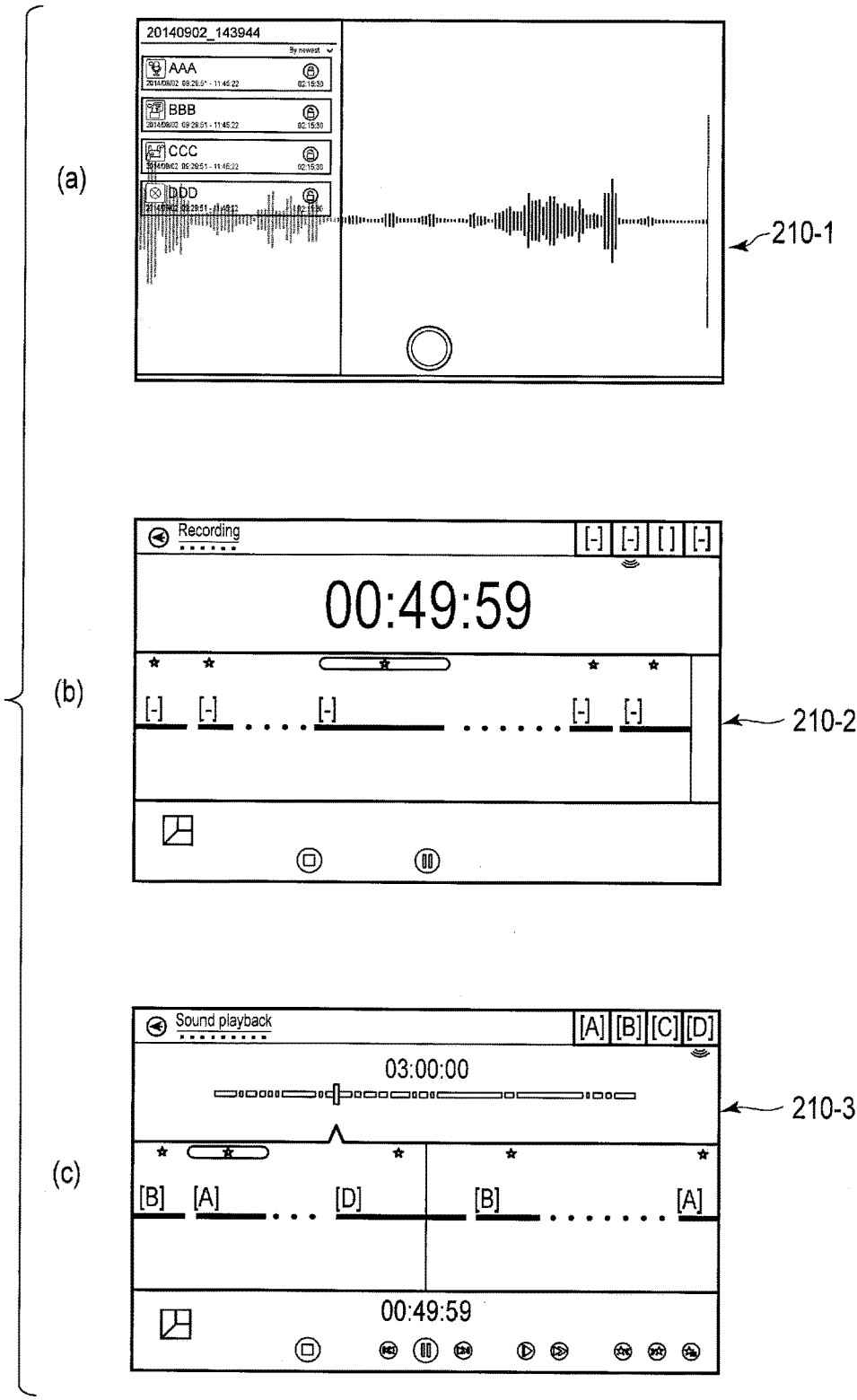
FIG. 9 is an exemplary view showing examples of a home screen, a recording-in-progress screen and a playback-in-progress screen displayed by the recording/playback program operating in the electronic device according to the embodiment.

From the screen displays of a home screen 210-1 (FIG. 9(*a*)), a recording-in-progress screen 210-2 (FIG. 9(*b*)) and a playback-in-progress screen 210-3 (FIG. 9(*c*)) which are included in the recording/playback program 202, the playback-in-progress screen explained in FIG. 5 is equivalent to the playback-in-progress screen 210-3 (FIG. 9(*c*)) which is displayed corresponding to a user operation (instruction input). The screen display which is performed when the recording/playback program 202 is operated is explained in association with enlarged displays or exemplary displays for explanation with reference to FIG. 10, etc.

The home screen 210-1, the recording-in-progress screen 210-2 and the playback-in-progress screen 210-3 which are shown in FIG. 9 as examples and are included in the recording/playback program 202 transition in accordance with each user operation (instruction input). FIG. 9 shows screen examples. It is obvious that the touch panel 22 can control the input to the screen displayed on the LCD 21.

Figure 10:
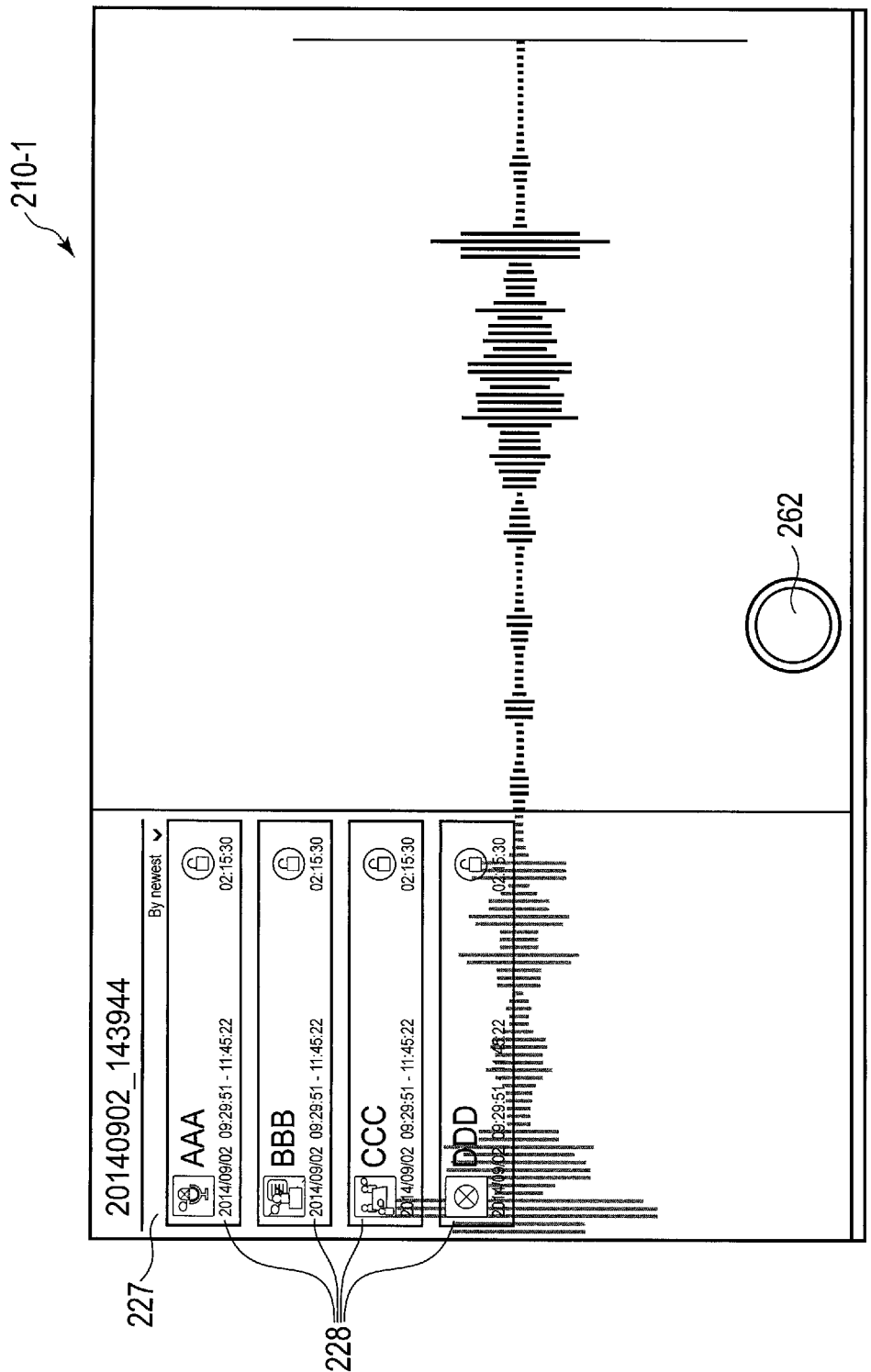
FIG. 10 is an exemplary enlarged view of the example of the home screen shown in FIG. 9(a).

The home screen 210-1 shown in FIG. 9(*a*) is the basic screen which is displayed by the recording/playback program 202 (the feedback processor 330) at the time of, for example, activation. FIG. 10 is an exemplary enlarged view of the home screen 210-1 shown in FIG. 9(*a*).

As shown in FIG. 10, the home screen 210-1 includes a recording button 262 for starting recording and an index display 227. The index display 227 displays an object 228. The object 228 serves as a button for starting playback and indicates sound data (or a sound file) which has been already recorded, stored and registered. The user is able to start recording by touching or tapping the recording button 262. The user is able to start playing back the sound data indicated by the object 228 by selecting the object 228 displayed in the index display 227 through a touch or tap operation.

Various types of information allowing the user to select the target sound data are displayed on the object 228; for example, the information includes the file name added by the user, the recording start time, the recording end time and the recording time. When the number of registered sound data items exceeds the number of sound data items which can be displayed in the area of the index display 227, only some of the objects 228 of the registered sound data items are displayed in the index display 227. The objects 228 to be displayed are changed (scrolled) by, for example, swiping or flicking the area of the index display 227. The arrangement order of the objects 228 in the index display 227 can be switched between the chronological order and the reverse chronological order in the recording start time.

If the user can recognize the type of sound data indicated by the object 228 displayed in the index display 227 by merely taking a look at the object 228, the user will be able to more easily find out the target sound data. The convenience will be improved. In consideration of this factor, the meeting type determination module 370 shown in FIG. 4 determines the type of recorded sound (in other words, the type of meeting described later) at the time of, for example, the end of recording. For example, this determination result is shown to the user through the icons shown in FIG. 11 by the feedback processor 330 as shown in FIG. 10.

Figure 11:
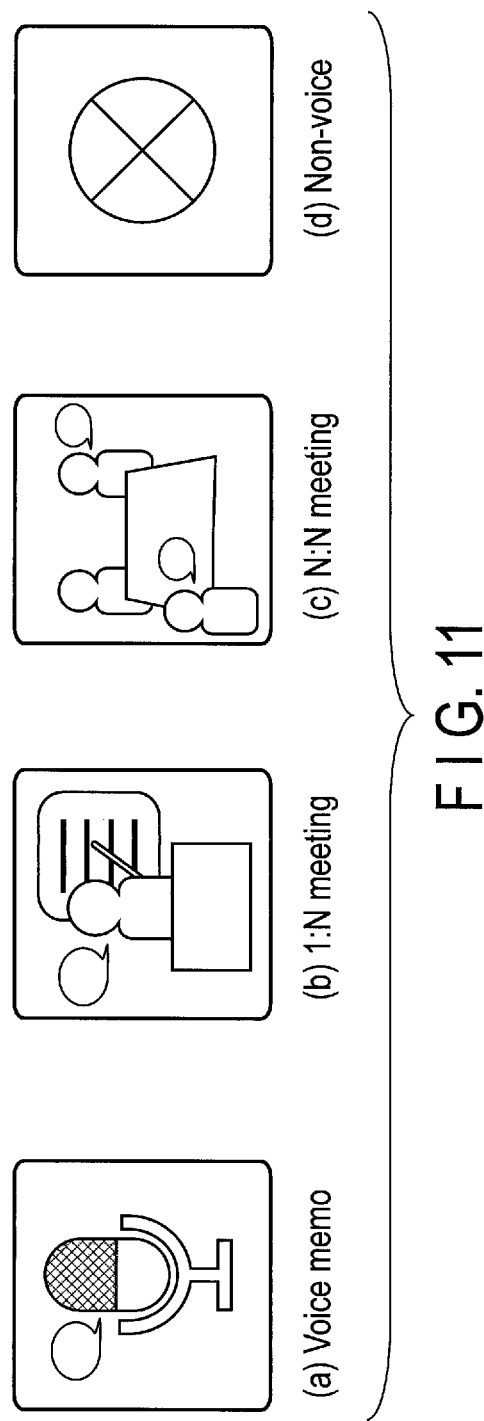
FIG. 11 is an exemplary view showing an example of a group of icons used to display the type of sound data in the recording/playback program operating in the electronic device according to the embodiment.

FIG. 11 shows an example of a group of icons used to show, to the user, the result of the process for determining the type of meeting by the meeting type determination module 370.

The meeting type determination module 370 classifies the sound recorded by the recording function of the recording/playback program 202 into, for example, a "voice memo" type (a first type), a "1:N meeting" type (a second type), an "N:N meeting" type (a third type) and a "non-voice" type (a fourth type). The "voice memo" type indicates a short recorded sound which is presumed to be a simple memo based on voice. This type of sound is based on the voice of one speaker. The "1:N meeting" type indicates a sound in which one person continues to speak to people present in, for example, a presentation, a communication meeting or a lecture. The "N:N meeting" type indicates a sound in which people discuss something in, for example, a meeting or a brainstorming session. The "non-voice" type indicates a sound which does not include a voice zone. These classifications "voice memo", "1:N meeting", "N:N meeting" and "non-voice" based on the utterance state shall be referred to as the type of meeting.

When the home screen 210-1 including the index display 227 is displayed, the recording/playback program 202 (the feedback processor 330) displays one of the icons shown in FIG. 11(a) to FIG. 11(d) on each object 228 in the index display 227 based on the result of the process for determining the type of meeting by the meeting type determination module 370. More specifically, the icon shown in FIG. 11(a) is displayed on the object 228 indicating sound data determined as the "voice memo" type. The icon shown in FIG. 11(b) is displayed on the object 228 indicating sound data determined as the "1:N meeting". The icon shown in FIG. 11(c) is displayed on the object indicating sound data determined as the "N:N meeting" type. The icon shown in FIG. 11(d) is displayed on the object 228 indicating sound data determined as the "non-voice" type.

In this manner, it is possible to show the type of each sound in order to help the user to find out the target sound when a list of recorded sounds is displayed. Thus, the visualization of sound is realized. In place of icons, for example, the text of "voice memo", "1:N meeting", "N:N meeting" and "non-voice" may be displayed to realize the visualization of sound.

Figure 12:
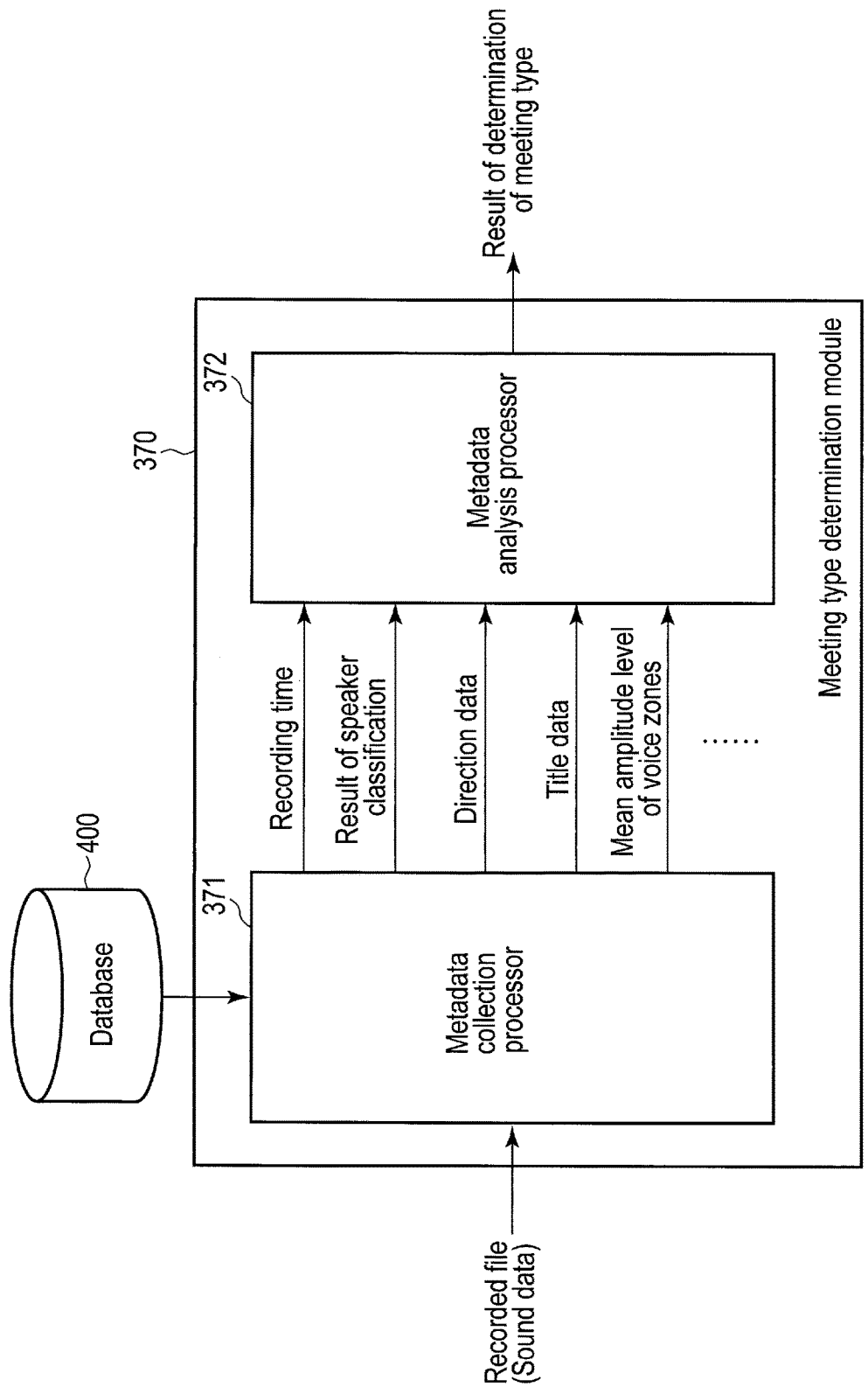
FIG. 12 is an exemplary view for explaining an example of a process for determining the type of meeting performed in the recording/playback program operating in the electronic device according to the embodiment.

With reference to FIG. 12, this specification explains an example of the process for determining the type of meeting by the meeting type determination module 370. As shown in FIG. 12, the meeting type determination module 370 comprises a metadata collection processor 371 and a metadata analysis processor 372.

The metadata collection processor 371 collects various types of metadata stored in a database 400 as well as recording files (recorded sound data). The database 400 is constructed in, for example, the nonvolatile memory 109. The metadata to be collected includes, for example, the length of recording time, the number of determined speakers and the frequency of speaker replacement presumed based on speaker determination. The frequency of speaker replacement can be calculated by, for example, the following equation (1).

Frequency of speaker replacement=Number of speaker replacements/Number of voice zones     Equation (1)

In the above equation (1), the number of speaker replacements is, for example, the number of switches of the speaker from Mr. A to Mr. B. The number of voice zones is the number detected in voice activity detection (VAD). In addition to these examples, direction data which can be presumed when sound is recorded by stereo-microphones 12R and 12L, and the mean amplitude level of voice zones detected in voice activity detection (VAD) may be stored in the database 400, and may be used as additional data for the determination of the type of meeting. As stated above, the type of meeting may be determined by the meeting type determination module 370 at various time points after recording as well as at the time of recording. Thus, the specific character data included in, for example, the file name or title set by the user with regard to sound data may be stored in the database 400, and may be used as additional data for the determination of the type of meeting.

Figure 13:
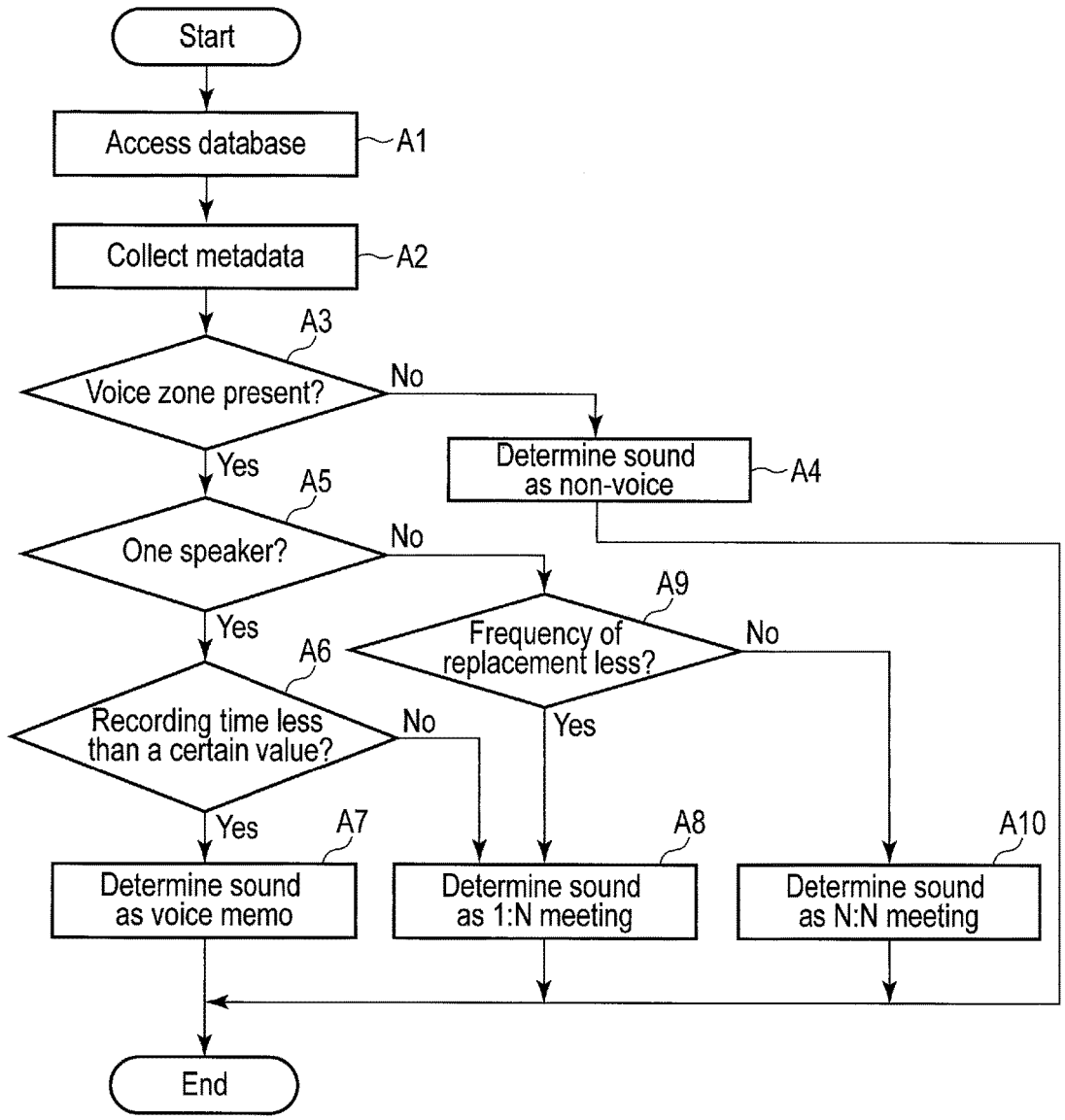
FIG. 13 is an exemplary flowchart showing an example of the flow of the process for determining the type of meeting performed in the recording/playback program operating in the electronic device according to the embodiment.

The metadata analysis processor 372 analyzes metadata corrected by the metadata collection processor 371 and determines the type of meeting. FIG. 13 shows an example of the flow of the process for determining the type of meeting by the metadata analysis processor 372 (including the collection of metadata by the metadata collection processor 371).

The metadata collection processor 371 accesses the database 400 (block A1) and collects metadata (block A2). Subsequently, the metadata analysis processor 372 examines whether or not a voice zone is detected from the sound to be processed, using the metadata collected by the metadata collection processor 371 (block A3). When no voice zone is detected (NO in block A3), the metadata analysis processor 372 determines the sound as the "non-voice" type (block A4).

When a voice zone is detected (YES in block A3), the metadata analysis processor 372 examines whether or not the number of speakers detected from the sound is one (block A5). When the number of speakers is one (YES in block A5), the metadata analysis processor 372 further examines whether or not the recording time is less than a predetermined threshold (for example, five minutes) (block A6). When the recording time is less than the threshold (YES in block A6), the metadata analysis processor 372 determines the sound as the "voice memo" type (block A7). When the recording time is greater than or equal to the threshold (NO in block A6), the metadata analysis processor 372 determines the sound as the "1:N meeting" type (block A8).

When the number of speakers is not one, in other words, when the number of speakers is more than one (NO in block A5), the metadata analysis processor 372 examines whether or not the frequency of speaker replacement is less than a predetermined threshold (block A9). When the frequency of speaker replacement is less than the threshold (YES in block A9), the metadata analysis processor 372 determines the sound as the "1:N meeting" type (block A8). When the frequency of speaker replacement is greater than or equal to the threshold (NO in block A9), the metadata analysis processor 372 determines the sound as the "N:N meeting" type (block A10).

The number of speakers presumed by speaker determination is not always correct. Therefore, for example, even when the number of speakers is more than one (NO in block A5), the sound may be determined as the "voice memo" type on the condition that the recording time is less than the threshold, and further, the direction data is constant, or the mean amplitude level is high, or the specific characters are not included in the file name or title (for example, the characters of brainstorming, meeting and presentation).

The type of meeting of sound is determined in the above manner, and the determined type is shown to the user through, for example, the icons shown in FIG. 11. Thus, it is possible to realize a user-friendly GUI which enables the user to easily find out the target sound.

Figure 14:
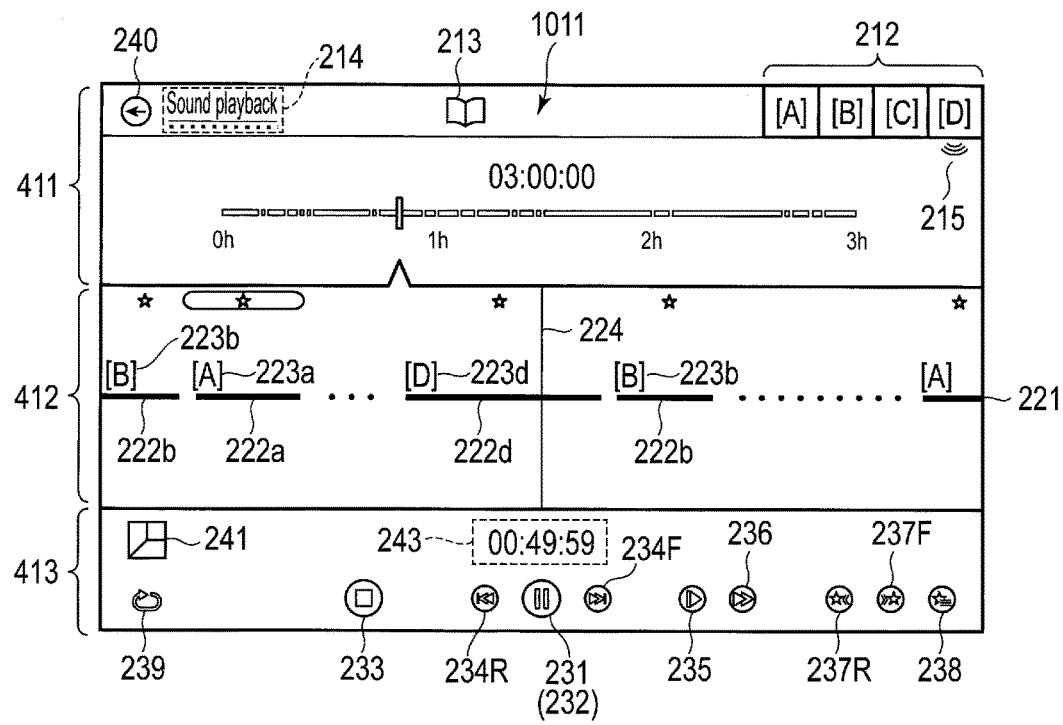
FIG. 14 is an exemplary enlarged view of the example of the playback-in-progress screen shown in FIG. 9(c).

FIG. 14 is an exemplary enlarged view of the playback-in-progress screen 210-3 shown in FIG. 9(c). The playback-in-progress screen 210-3 shown in FIG. 9(c) and a screen 1011 shown in FIG. 14 are substantially the same as the display example explained with reference to FIG. 5. Thus, the detailed explanation is omitted. The first display area 411 includes, for example, the time bar 211, the locator 211a and the return button 240. The second display area 412 includes, for example, the playback position display field 221 for displaying the playback position (time) of sound content (sound data), utterance bars 222*a*, 222*b*, . . . , 222*n*, speaker identifiers 223*a*, 223*b*, . . . , 223*n*, the current position mark (line) 224 and the marking button 225. The third display area 413 includes, for example, the pause button 231/the play button 232, the stop button 233, the skip (forward) button 234F, the skip (return) button 234R, the slow-motion play button 235, the high-speed play button 236, the mark skip (forward) button 237F, the mark skip (return) button 237R, the mark list display button 238 and the repeat button 239. The third display area 413 includes the display switch button 241 which allows the user to input an instruction for switching the display style of the screen 210 with the snap view screen described later.

Figure 15:
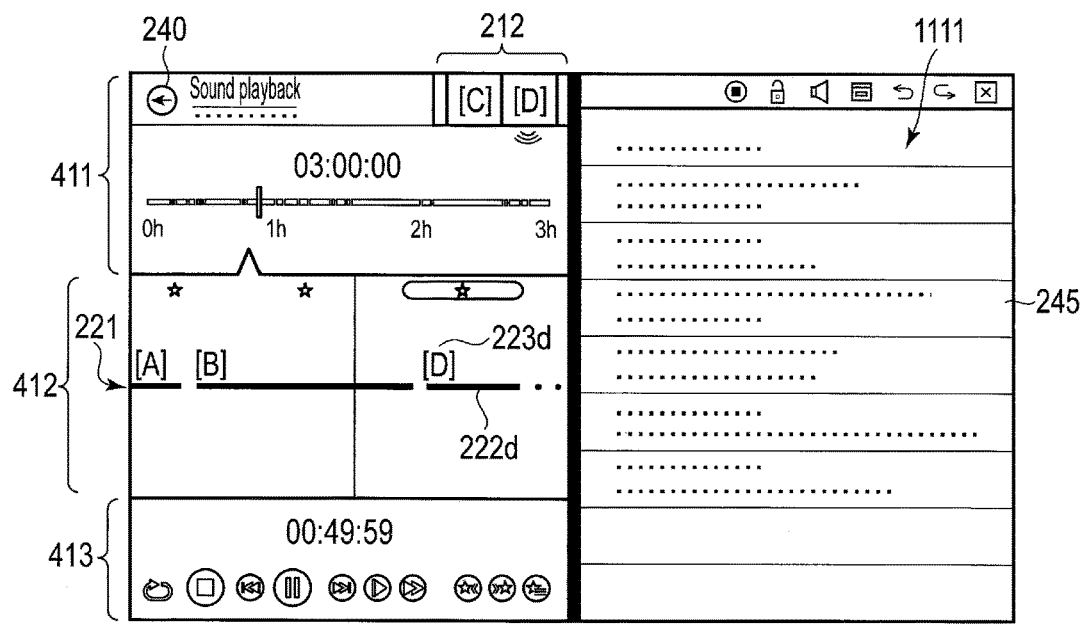
FIG. 15 is an exemplary view showing an example in which the screen is divided into two parts by display switch.

When the display switch button 241 is touched or tapped, the screen 1011 is divided into two parts from side to side as shown in FIG. 15. In one of the two parts (for example, on the left screen), the first display area 411, the second display area 412 and the third display area 413 are displayed. In the other part (for example, on the right screen), a snap view screen 245 is displayed. For example, the snap view screen 245 displays the start time and the end time of each utterance bar of the specified individual speaker in order.

In FIG. 14, etc., for example, when an arbitrary position is tapped in the first display area 411, a control command for executing the playback of sound data near the playback time corresponding to the tapped position can be input to the CPU 101 of the PC main body 10.

When the display of an arbitrary position is dragged in the second display area 412, it is possible to control the display and change (set) the playback position in the substantially same manner as a seek operation. To show the speaker identification, the display color of only the selected speaker can be changed. Even when the speech is short, the display can be performed such that the speaker is specified with the least number of pixels. Moreover, it is possible to perform time display near the central bottom part of the second display area 412 such as the playback time or the total time of speeches (a group of sounds) during playback, or the total time of speeches of the same speaker for each speaker.

In the enlarged view (second display area) 412, a control command for finely adjusting the playback position can be input by dragging the whole enlarged part laterally.

For example, when the enlarged display part is scrolled through a flick or swipe operation in the enlarged view, the playback start position of sound data is automatically adjusted (snapped) to the head of utterance (sound data) by the activation and operation of the recording/playback program 202. Scrolling is preferably a display (an operation) having inertia.

On a screen 1111 shown in FIG. 15, the display width of each of the first display area 411, the second display area 412 and the third display area 413 is reduced as the snap view screen 245 is displayed. For example, when the number of speakers to be displayed in the speaker display area 212 is not fitted into the display area, it is possible to use a ticker display which cuts a part of the speakers in order to prompt scrolling (a ticker display, which passes a character string through a specific range (or sequentially changes the display position of a character in one direction) in display).

Figure 16:
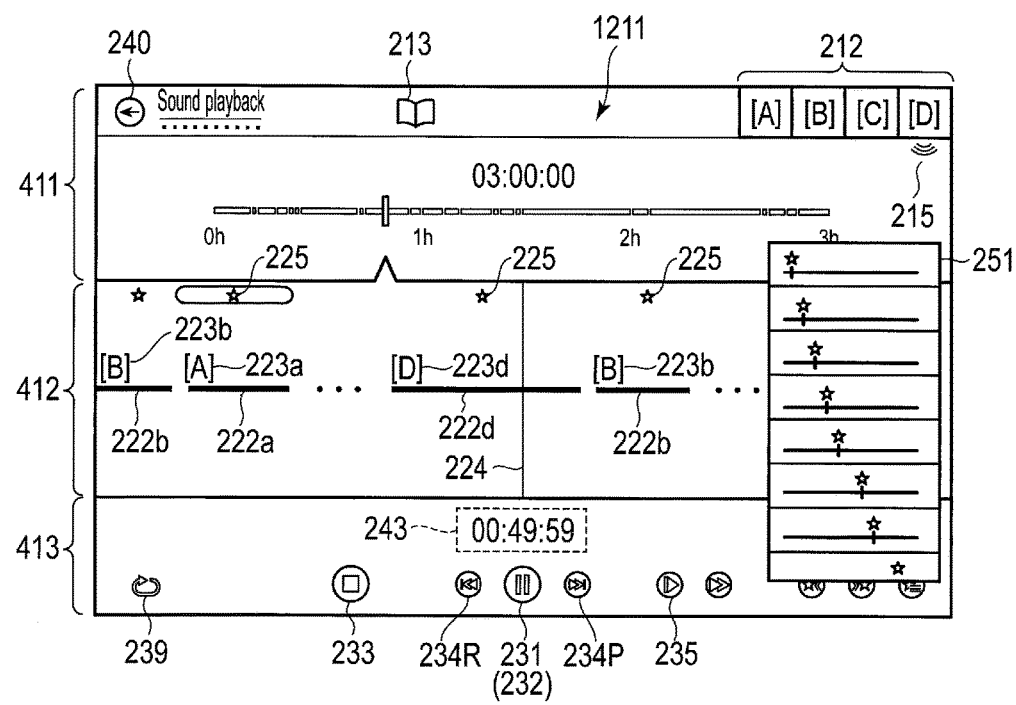
FIG. 16 is an exemplary view showing an example of a file list display.

FIG. 16 is an exemplary display example in which all of the utterance bars provided with the marking button 225 are displayed as a file list display 251 in a pop-up manner by touching or tapping the mark list display button 238. By marking the marking button 225 through a touch or tap operation while the sound data of an arbitrary speaker is played back, the file list display 251 provided with the marking button 225 shown in FIG. 16 may display the number of sound data items of the marked speaker and an approximate position of the recording time of each sound data item relative to the total time (in other words, where in the total time each sound data item is recorded).

Figure 17:
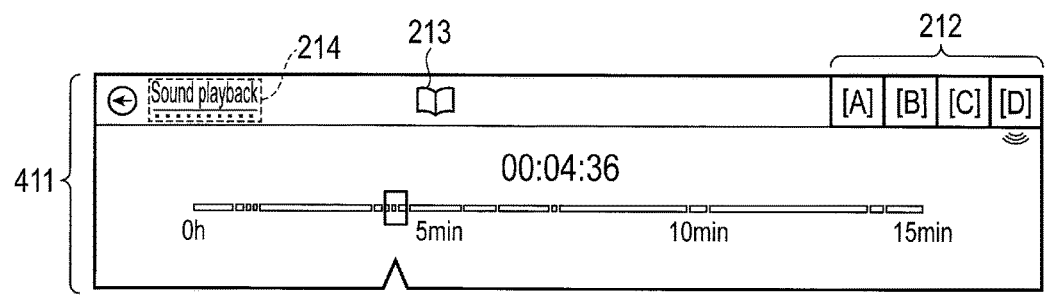
FIG. 17 is an exemplary view showing an example of a time bar displayed on the playback-in-progress screen.

FIG. 17 is an exemplary display example of the time bar displayed on the playback-in-progress screen. In this display example, the entire length of the time displayed in the first display area 411 exemplarily shown in FIG. 14, etc., is a quarter of an hour (15 minutes). As shown in FIG. 17, the display range of the time bar 211 is changed with regard to the utterance of the speaker played back in the current playback position 224 in FIG. 14 (specifically, with regard to the utterance of utterance bar 222*d* and speaker identification display [D] 223*d*). In this manner, the playback position of sound data displayed by one corresponding utterance bar can be displayed in more detail. In the enlarged view, the display width (in other words, the entire lateral width) of the whole enlarged part indicates approximately 30 seconds.

Figure 18:
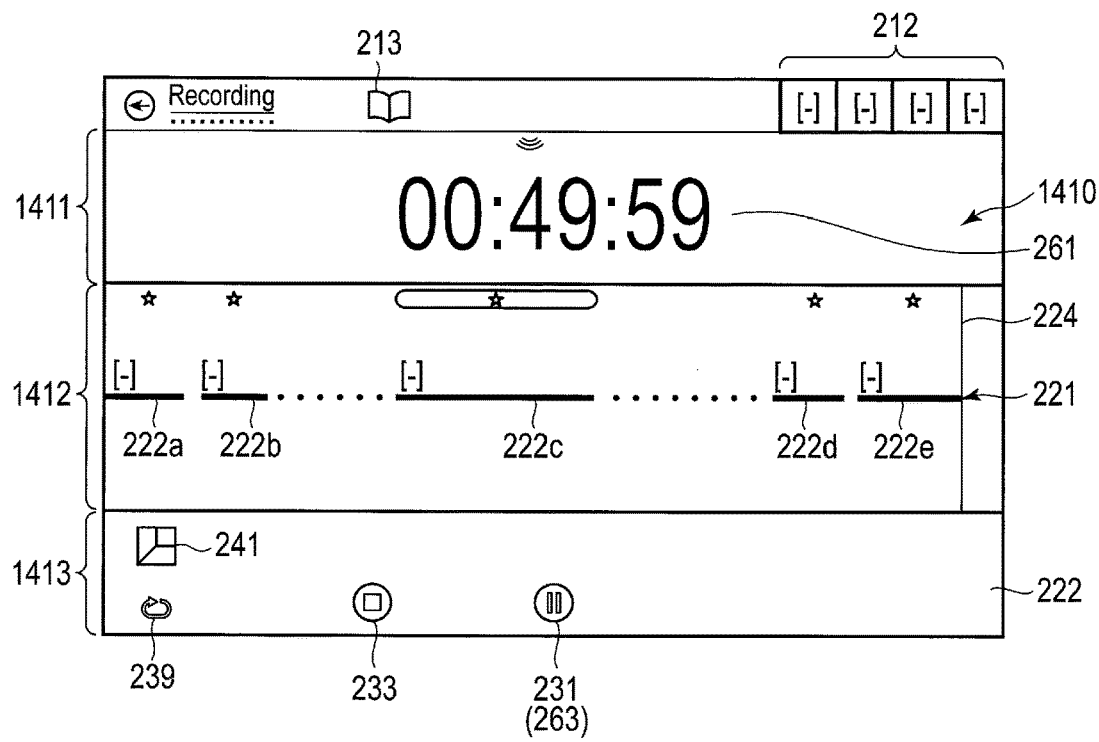
FIG. 18 is an exemplary enlarged view of the example of the recording-in-progress screen shown in FIG. 9(b).

FIG. 18 is an exemplary enlarged view of the recording-in-progress screen 210-2 shown in FIG. 9(*b*). The recording-in-progress screen display 210-2 shown in FIG. 9(*b*) or a recording-in-progress screen 1410 shown in FIG. 18 does not have a time bar display or a locator display in a first display area 1411, and displays the recording time (elapsed time) in a recording time display portion 261. In this example, the speaker determination by the speaker determination module 323 is not performed in recording. Therefore, for example, an image signal (display signal) for performing a display indicating that the operation in progress is different from the operation during playback, such as "-", . . . , "-", may be output and displayed in the speaker display area 212 for displaying speakers as the output from the feedback processor 330. The list display button 213 for displaying the index display 227 which displays a list of stored sound data items is displayed at a predetermined position.

In a second display area 1412, only partial information which is analyzable in real time even during recording is displayed; for example, the results of detection of voice zones (utterance bars) 222*a* to 222*n* are displayed. The current position mark (line) 224 indicating the current recording time (position) may be moved to a predetermined position in the right part of the display field 221 in comparison with the position during playback.

The marking button 225 is displayed near substantially the central portion of each of utterance bars 222*a* to 222*n* in the length direction (time). By tapping the vicinity of the marking button 225, each utterance which is currently recorded can be marked.

A third display area 1413 includes, for example, the pause button 231/the recording button 262 and the stop button 233. The third display area 413 includes the display switch button 241 which allows the user to input an instruction for switching the display style of the screen 210 with the snap view screen exemplarily shown in FIG. 18. The pause button 231 and the recording button 262 are alternately displayed on a toggle basis in accordance with each touch operation or tap operation. The recording of utterance of the current speaker is started by touching or tapping the recording button 262. In a state where the utterance of the current speaker is recorded by the recording button 262, the pause button 231 is displayed. When the pause button 231 is touched or tapped, the recording is temporarily stopped, and the recording button 232 is displayed.

Figure 19:
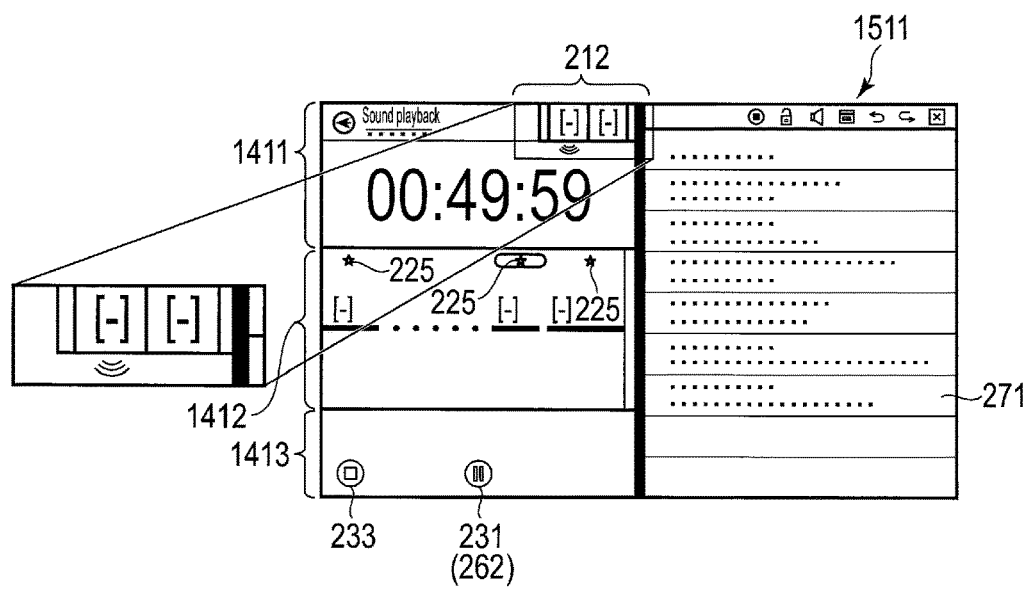
FIG. 19 is an exemplary view showing an example of a snap view screen.

In the snap view screen display exemplarily shown in FIG. 19, the first display area 1411, the second display area 1412 and the third display area 1413 are displayed in one of two right and left split displays of a screen 1511 as shown in the screen 1511. A snap view screen 271 is displayed. For example, the snap view screen 271 is capable of displaying the start time and the end time of each of the specified voice zones in order.

Figure 20:
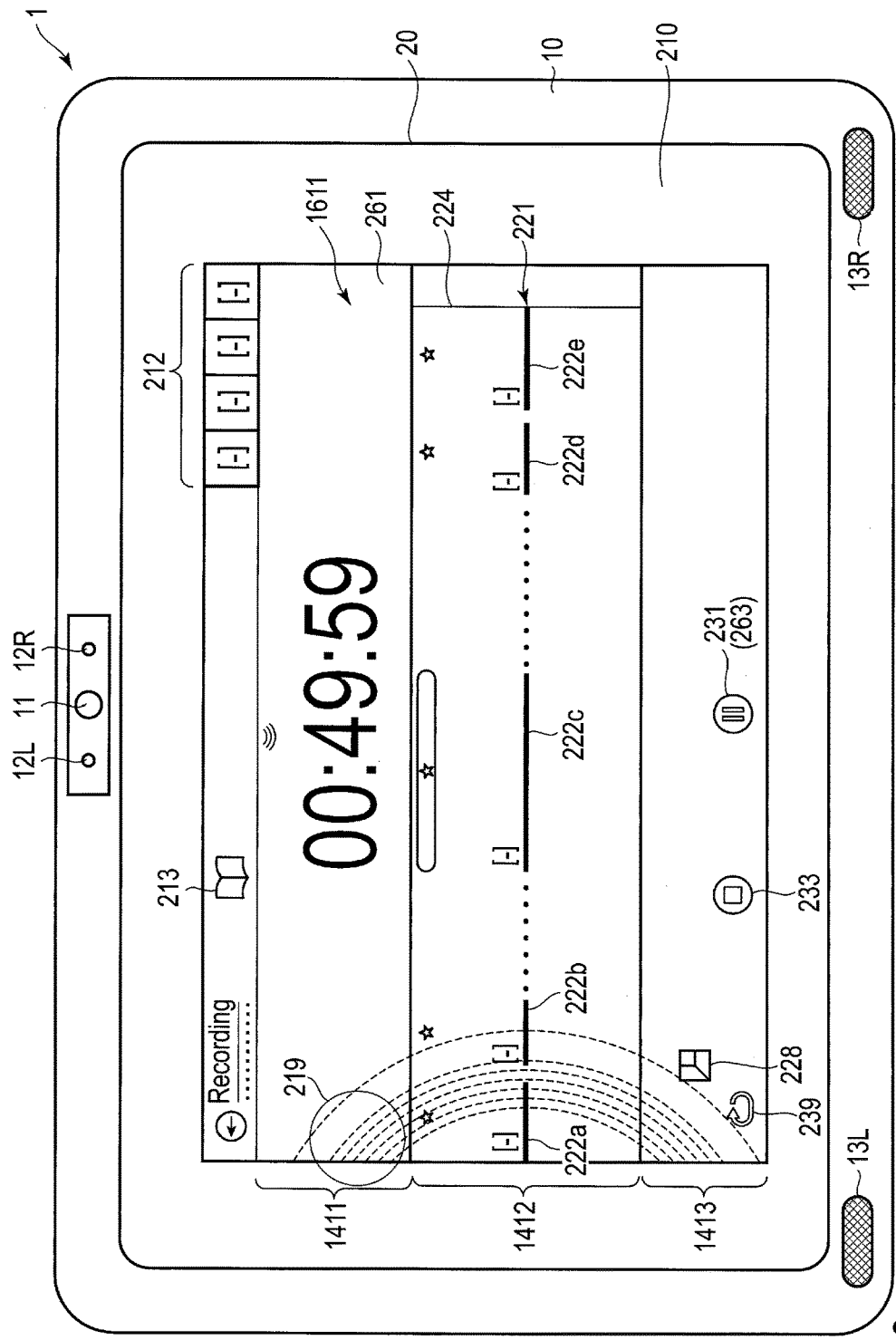
FIG. 20 is an exemplary view showing another example of the recording-in-progress screen.

FIG. 20 shows another example of the screen display during recording. For example, a speaker direction mark 219 may be displayed on the screen 210. The speaker direction mark 219 indicates the result of estimation of the direction in which the voice/sound is input, in other words, the direction in which the speaker is present. Thus, the direction in which the speaker of the detected voice is present may be displayed.

With regard to the voice zones shown in FIG. 18 to FIG. 20, statistical analysis (clustering analysis) is applied to all of the recorded data items at a predetermined time point after the end of recording. Thus, the speaker is specified. The specified speaker is updated in the speaker display during playback.

The sound data which is stored and recorded can be edited as shown in FIG. 21 or FIG. 22 by using the silent zones detected by the playback start position adjuster 322 of the recording/playback program 202. FIG. 21 shows an example of deletion of a partial zone of recorded sound data. FIG. 22 shows an example of cutout (trimming) of necessary information from sound data. In the editing shown in FIG. 21 or FIG. 22, the head of the target sound data can be easily set.

For example, as shown in FIG. 21, a partial zone of recorded sound data can be deleted by movements (instruction inputs) [a], [b] and [c] of the locator 211a (see FIG. 5) located at a predetermined position of the time bar 211 shown in FIG. 5 with a finger of the user.

The first operation [a] of the user's finger relative to the locator 211a of the time bar 211 is detected. For example, an operation from a direction orthogonal to the extension direction of the time bar 211a to the time bar 211 is detected.

Subsequently, movement (the second operation) [b] of the locator 211a on the time bar 211 with the user's finger is determined as the setting operation of the target zone.

Subsequently, the processing content input by the user as an instruction is specified based on the direction of movement (the third operation) [c] of the user's finger.

For example, when the direction of movement of the user's finger is substantially orthogonal to the direction of movement of the finger for setting the target zone by movement [b], and further, the direction of movement is a direction toward the base bottom portion of the image displayed on the display surface of the touch panel 22 (in other words, toward the bottom of the erect screen), the operation is determined as deletion.

At this time, the above automatic adjustment can be applied to each of the first operation [a] of the user's finger and the end position [b] of the second operation of the user's finger specified by the third operation of the user's finger.

When the user deletes the data of a partial zone of sound data displayed on the axis of time, the user can easily set the zone of sound data to be deleted to the range from the silent zone at the head of a voice zone to the silent zone at the tail of the voice zone by merely and roughly instructing (inputting) the deletion start position (the head of the voice zone) and the deletion end position (the tail of the voice zone) on the time bar 211 displayed on the touch panel 22. In this manner, when a partial zone of recorded sound data is deleted, the deletion zone can be intuitively set.

FIG. 22 shows an example in which the cutout (trimming) of a partial zone (necessary information) from recorded sound data is performed by movements (instruction inputs) [d], [e] and [f] of the locator 211a (see FIG. 5) located at a predetermined position of the time bar 211 shown in FIG. 5 with a finger of the user.

The first operation [d] of the user's finger relative to the locator 211a of the time bar 211 is detected. For example, an operation from a direction orthogonal to the extension direction of the time bar 211 to the time bar 211 is detected.

Subsequently, movement (the second operation) [e] of the locator 211a on the time bar 211 with the user's finger is determined as the setting operation of the target zone.

Subsequently, the processing content input by the user as an instruction is specified based on the direction of movement (the third operation) of the user's finger.

For example, when the direction of movement of the user's finger is substantially orthogonal to the direction of movement [e] of the finger for setting the target zone, and further, the direction of movement is a direction toward the upper portion of the image displayed on the display surface of the touch panel 22 (in other words, toward the top of the erect screen), the operation is defined as cutout (trimming).

At this time, the above automatic adjustment can be applied to each of the first operation [d] of the user's finger and the end position of the second operation [e] of the user's finger specified by the third operation of the user's finger.

When the user cuts out (trims) the data of a partial zone of sound data displayed on the axis of time, the user can easily set the zone of sound data to be cut out (trimmed) to the range from the silent zone at the head of a voice zone to the silent zone at the tail of the voice zone by merely and roughly instructing (inputting) the head (the start position) and the tail (the end position) of the target voice zone on the time bar 211 displayed on the touch panel 22.

In this manner, the target zone for cutout (trimming) of necessary information of recorded sound data can be intuitively set.

In the above processing example shown in FIG. 21 or FIG. 22, it is possible to cut out and store all of the utterances of the same speaker (in other words, a plurality of sound data items of the same speaker in which determined zones are different) in association with the speaker specification explained below. In this case, for example, a user interface (UI) screen may be displayed in order to allow the user to select an instruction input regarding whether only the sound data of the specified zone should be stored or all of the sound data items related to the same speaker should be stored.

In the above embodiment, apart from the operation of the locator on the time bar, automatic adjustment may be performed such that sound data is played back from the head of the utterance zone whose speaker is identified near the seek position in accordance with the display range of the time bar in a case of recorded sound content which displays the result of speaker identification.

In the above embodiment, apart from the operation of the locator on the time bar, the playback position may be automatically adjusted by buffering sound data near the seek position and performing zone determination in accordance with the display range of the time bar in a case of recorded sound content which displays the result of speaker identification.

In the above embodiment, apart from the operation of the locator on the time bar, automatic adjustment may not be performed on purpose in accordance with the display range of the time bar in a case of recorded sound content which displays the result of speaker identification.

In the above embodiment, the display range of the time bar may be switched by a zoon-in/zoon-out operation.

In the above embodiment, a zoom-in/zoom-out operation may be performed by a pinch-in/pinch-out operation in addition to a normal button when the user inputs an instruction through the touch panel.

In the above embodiment, in a manner similar to that of the case of editing explained in FIG. 21 and FIG. 22, automatic adjustment may be performed by buffering sound data near the specified position and applying zone determination in the range specification when an editing operation such as the cutout of a sound file is performed apart from the operation of the locator on the time bar. In this case, flick may be available as an instruction input for the trimming (cutout and storage) and the deletion of a zone in an editing operation when the user inputs an instruction through the touch panel.

Figure 23:
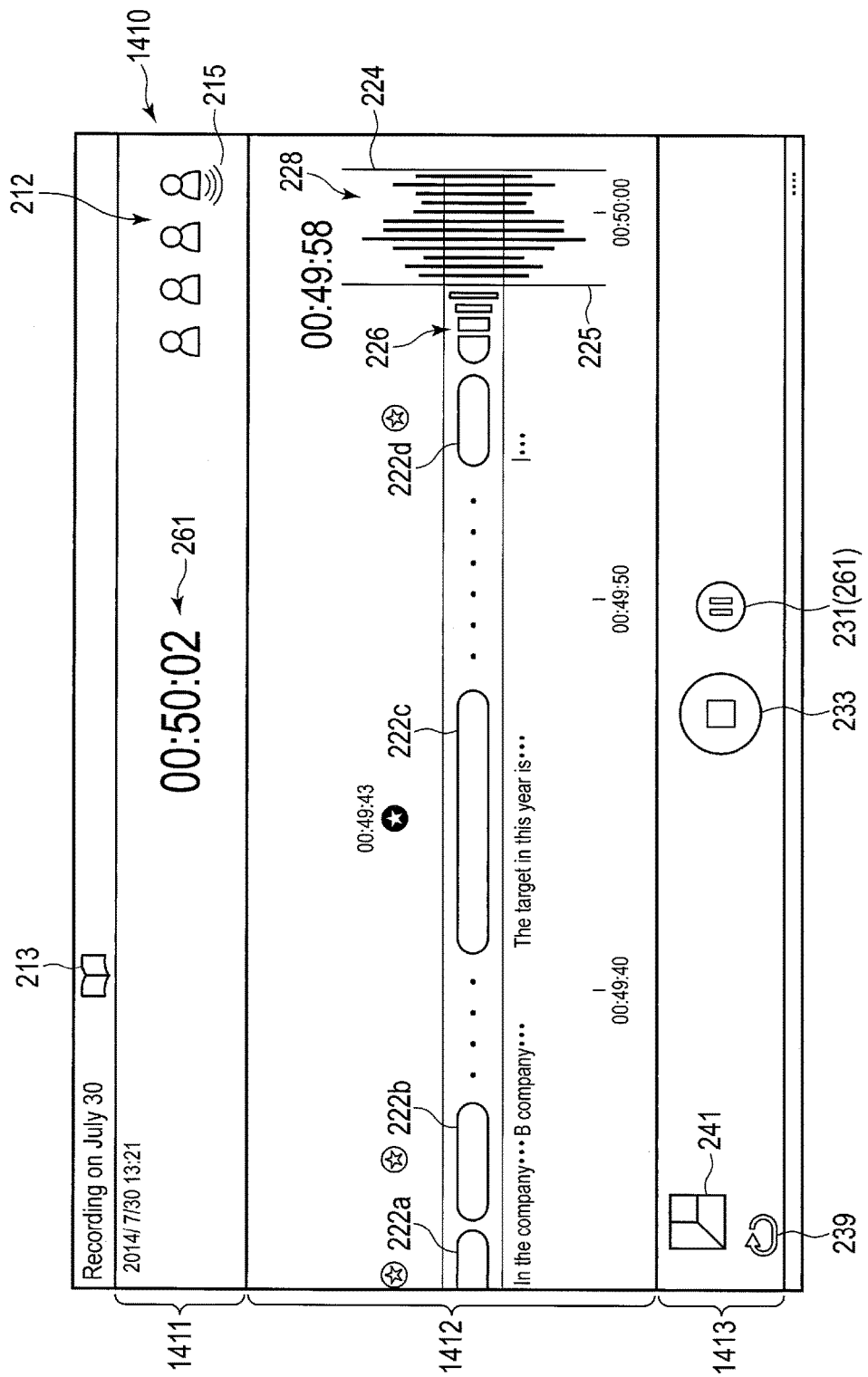
FIG. 23 is an exemplary view showing another example of the recording-in-progress screen.

FIG. 23 shows another display example of the screen during recording. The recording-in-progress screen 1410 does not display the time bar or the locator in the first display area 1411 and displays the recording time (the absolute time may be displayed; however, the elapsed time is displayed here) (for example, 00[hours]:50[minutes]:02[seconds]) in the recording time display portion 210-21. In this example, the speaker determination module 358 performs speaker determination during recording. The speaker determination module 358 estimates the direction of sound based on the difference between the input signal of microphone 12R and the input signal of microphone 12L when a voice zone is detected by the zone determination module 354. Based on the result of estimation, the speaker determination module 358 is capable of specifying the direction of the speaker. It should be noted that the positions of a plurality of speakers need to be given to the speaker determination module 358 in advance. When the speaker is specified, the speaker display area 212 displays the utterance mark 215 near the icon of the speaker who is currently speaking.

The second display area 1412 displays the results of detection of voice zones (utterance bars) 222a to 222n and an input sound waveform 228 as visualization information of recording. Recorded data is visualized along the axis of time in the following manner: the current time is indicated at the right end of the figure, and the time goes back to the past toward the left end. In a manner similar to that of FIG. 5, speaker identifiers 223a to 223n indicating speakers (not shown in FIG. 23) may be displayed near utterance bars 222a to 222n. The color of the utterance bars 222 and/or the speaker identifiers 222 may be changed depending on the speaker. In a manner similar to that of FIG. 5, each utterance can be marked by tapping the vicinity of the marking button 225 displayed near desired utterance bars 223a to 223n (not shown in FIG. 23). The time is displayed every ten seconds in the lower part of the second display area 1412.

As explained with reference to FIG. 4, there is a difference in the processing time between the waveform display based on the result of power calculation and the bar display based on the zone determination calculation. The bar display is late. If both of them are displayed in the same row, and the current time is displayed at the right end of the screen, and the time goes back to the past toward the left end, the waveform 228 is displayed at the right end in real time and flows to the left side of the screen with time. With the display of the waveform 228, the zone determination module 354 performs zone determination. When a voice zone is detected, the waveform 228 is switched to the bar 222. It is not possible to determine whether the power is voice or noise only from the waveform display. However, the recording of sound can be confirmed by the combination use with the bar display. Since the real-time waveform is displayed in the same row as the slightly-late bar, the user can maintain his/her eyes on the same row. The direction of eyes is not dispersed. The user can obtain useful information with good visibility.

The time synchronization processor 356 is provided to switch the display target from the waveform 228 to the bar 222 gradually, instead of switching it in a moment. The time synchronization processor 356 displays the waveform/bar transition portion 226 between the waveform 228 and the rightmost bar 222d. In the waveform/bar transition portion 226, the waveform is displayed at the right end, and a bar is displayed at the left end. In the middle part, the waveform display is gradually changed to the bar display. Thus, the current power is displayed as the waveform at the right end. The display flows from right to left, and the display is updated. In this process, the waveform is continuously or seamlessly changed to a bar. Therefore, the user does not feel unnaturalness when observing the display.

The third display area 1413 includes, for example, the pause button 231/the recording button 261 and the stop button 233. The third display area 1413 includes the display switch button 241 which allows the user to input an instruction for switching the display style of the screen 210 with the snap view screen exemplarily shown in FIG. 18. The pause button 231 and the recording button 261 are alternately displayed on a toggle basis in accordance with each touch operation or tap operation. The recording of utterance of the current speaker is started by touching or tapping the recording button 261. In a state where the utterance of the current speaker is recorded by the recording button 262, the pause button 231 is displayed. When the pause button 231 is touched or tapped, the recording is temporarily stopped, and the recording button 261 is displayed.

FIG. 24 is the flowchart of the recording/playback program 202B for performing the display shown in FIG. 23. In block B12, the sound data from microphones 12R and 12L is input to the power calculator 352 and the zone determination module 354 via the audio capture 112. The power calculator 352 calculates, for example, a root-mean-square with respect to sound data at regular time intervals and outputs the result as power. The zone determination module 354 applies voice activity detection (VAD) to sound data and sectionalizes the sound data into a voice zone in which a person produces voice and the other zone which is a non-voice zone (a noise zone and a silent zone). In block B12, the speaker determination module 358 specifies the speaker of the voice zone determined by the zone determination module 354 based on the difference between sound data from microphone 12R and sound data from microphone 12L.

In block B14, the outputs of the power calculator 352 and the zone determination module 354 are supplied to the time synchronization processor 356. The time synchronization processor 356 determines the time point at which bar display can be started (for example, 00 hours, 49 minutes, 58 seconds) based on the delay time of the outputs of the power calculator 352 and the zone determination module 354. The time synchronization processor 356 provides the sound waveform drawing module 360 and the voice zone drawing module 362 with a control signal such that the waveform/bar transition portion 226 is displayed in the zone for several seconds between the head time point of the voice zone including the time point at which bar display can be started and the time point at which bar display can be stated.

In block B16, the sound waveform drawing module 360 and the voice zone drawing module 362 update the second display area 1412 shown in FIG. 23. The display of the display area 1412 is shifted to left, and the waveform of the current time is displayed at the right end. In a manner similar to that of FIG. 5, the feedback processor 330 controls the display of the third display area 1413 and the recording time display portion 261 of the first display portion 1411.

In block B18, whether or not recording is stopped is determined. The above process is repeated and the display is continuously updated until recording is stopped. The stopping of recording is instructed through the pause button 231 or the stop button 233.

The recording/playback program 202B may include a sound recognition module (not shown in FIG. 4), recognize the first sound in a voice zone and display the result of recognition as text under the utterance bar 222. With this configuration, convenience is improved when a voice zone is marked to immediately access to a specific point later.

According to the display shown in FIG. 23, sound is visualized during recording in terms of, for example, the display of power, the display of a voice zone, the speaker data of a voice zone, the utterance content of a voice zone, and the marking of a necessary voice zone. In this manner, the user can obtain useful information. For example, an important point is marked in recorded content to play back only the important point. When the waveform is not displayed even during speech, the position or angle of a microphone (terminal) can be adjusted, and further, the microphone setting including the gain and the noise suppression level can be reconsidered. In this manner, recording failure can be prevented. Similarly, when no utterance bar is displayed (no voice zone is detected) although the waveform is displayed, the position or angle of a microphone (terminal) can be adjusted, and further, the microphone setting including the gain and the noise suppression level can be reconsidered. In this manner, recording failure can be prevented. Moreover, the display of the waveform or an utterance bar during recording provides the user with a sense of safety. The above determination of recording failure is based on the visual judgment by the user relative to the screen. However, if no voice zone is detected after the waveform is input for a predetermined period, the recording/playback program 202B may determine that the recording is unsuccessful and display and output an alarm.

In the above explanation, the waveform display is switched to the zone display immediately after a voice zone is detected. However, the start of zone display may be delayed from the time point at which bar display can be started. The period of waveform display may be elongated by the delay. Further, although the waveform display is gradually switched to the bar display in the above explanation, the waveform display may be momentarily switched to the bar display. This screen example is shown in FIG. 25. The waveform display may be finished at the time point at which bar display can be started (00[hours]:49[minutes]:56[seconds]) and at which the zone determination module 354 detects a voice zone. The zone display may be applied to the part before this time point. The waveform/bar transition portion 226 may be omitted. Even in this case, the zone display may be started at any time point as long as the start point is at or before the time point at which bar display can be started.

The power display may not be necessarily performed in the same row as the zone display. For example, a waveform and a bar may be separately displayed in two rows as shown in FIG. 26. On the screen shown in FIG. 23, the current time is fixed to the right end at all times. However, in FIG. 26, the current time is firstly displayed at the left end, and is moved to right with time. FIG. 26(b) is later than FIG. 26(a) in terms of time. In other words, the current waveform is added to the right side in series. When the current time has reached the right end, the display flows from right to left in a manner similar to that of FIG. 23. When a waveform and a bar are displayed in the first and second rows, respectively, the bar is displayed later than the waveform.

The display style of sound power is not limited to the waveform display. In FIG. 26, power may be displayed in a certain window as a value in place of the waveform. The position of the window may not be fixed. The window may be displayed at the right end of the waveform shown in FIG. 26 and may be moved to right with time.

FIG. 27 shows a modification example of the display example of the waveform/bar transition portion 226. FIG. 27(a) is the same as FIG. 23. The display is transitioned such that the waveform is converged up to the height of the bar of the head time point of the voice zone including the time point at which bar display can be started. However, as shown in FIG. 27(b), the display may be transitioned such that the waveform is converged up to zero. Although the display style is continuously transitioned from the waveform to the bar in the example, the display style may be transitioned by stages to some extent. Although the waveform is displayed as amplitude bars (perpendicular bars) at regular intervals in the example, the waveform may be displayed as envelope curves of power.

In the above explanation, an audio recorder is assumed. However, the present embodiment may be applied to a video camera which records sound as well. The above visualization may be realized by extracting sound data from a video signal output from the video camera. In this case, the face of the speaker may be displayed near the utterance bar by analyzing an image and obtaining the image of the speaker.

Each function described in the present embodiment may be realized by a processing circuit. For example, the processing circuit includes a programmed processor such as a central processing unit (CPU). The processor performs each of the described functions by executing a program stored in a memory. The processor may be a microprocessor including an electric circuit. For example, the processing circuit includes a digital signal processor (DSP), an application specific integrated circuit (ASIC), a microcontroller, a controller and other electric circuit components.

Each process of the present embodiment can be realized by a computer program. Therefore, an effect similar to that of the present embodiment can be easily realized by merely installing the computer program into a normal computer through a computer-readable storage medium in which the computer program is stored, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a memory in which sound data and attached data are stored;
a display on which an operation screen for recording and playing back the sound data is displayed; and
a hardware processor in communication with the memory and the display based on a recording/playback program, the hardware processor configured to:
obtain the sound data and the attached data from the memory, the attached data indicative of at least a number of speakers, a frequency of speaker replacement, and a length of recording time included in the sound data;
determine that a type of meeting of the sound data is a first type if the number of speakers determined for each utterance zone detected from the sound data is two or more and the frequency of speaker replacement is less than a first value, the frequency of speaker replacement being obtained by dividing a number of switches of the speakers by a number of utterance zones; and
display an icon indicative of the first type in correspondence with the speakers on a playback screen on the display.

2. The electronic device of claim 1, wherein the hardware processor is configured to:
determine that the type of meeting of the sound data is a second type if the number of speakers determined for each utterance zone detected from the sound data is two or more and the frequency of speaker replacement is greater than or equal to the first value; and
display an icon indicative of the second type in correspondence with the two or more speakers on the playback screen.

3. The electronic device of claim 1, wherein the hardware processor is configured to:
determine that the type of meeting of the sound data is a third type if no utterance zone is detected from the sound data; and
display an icon indicative of the third type in correspondence with the speakers on the playback screen.

4. The electronic device of claim 1, wherein the hardware processor is configured to determine the type of meeting based on a file name or a title of the sound data.

5. The electronic device of claim 1, wherein the hardware processor is configured to:
determine that the type of meeting of the sound data is the first type if the number of speakers determined for each utterance zone detected from the sound data is one and the recording time of the sound data is greater than or equal to a second value; and
display the icon indicative of the first type in correspondence with the speakers in the playing back screen.

6. A method comprising:
obtaining sound data and attached data from a memory, the attached data indicative of at least a number of speakers, a frequency of speaker replacement, and a length of recording time included in the sound data;
determining that a type of meeting of the sound data is a first type if the number of speakers determined for each utterance zone detected from the sound data is two or more and the frequency of speaker replacement is less than a first value, the frequency of speaker replacement being obtained by dividing a number of switches of the speakers by a number of utterance zones; and
displaying an icon indicative of the first type in correspondence with the speakers on a playback screen.

7. The method of claim 6, further comprising:
determining that the type of meeting of the sound data is a second type if the number of speakers determined for each utterance zone detected from the sound data is two or more and the frequency of speaker replacement is greater than or equal to the first value; and
displaying an icon indicative of the second type in correspondence with the two or more speakers on the playback screen.

8. The method of claim 6, further comprising:
determining that the type of meeting of the sound data is a third type if no utterance zone is detected from the sound data; and
displaying an icon indicative of the third type in correspondence with the speakers on the playback screen.

9. The method of claim 6, wherein the determining comprises determining the type of meeting based on a file name or a title of the sound data.

10. The method of claim 6, further comprising:
determining that the type of meeting of the sound data is the first type if the number of speakers determined for each utterance zone detected from the sound data is one and the recording time of the sound data is greater than or equal to a second value; and
displaying the icon indicative of the first type in correspondence with the speakers in the playing back screen.

* * * * *